United States Patent
Lou et al.

(10) Patent No.: US 12,525,225 B2
(45) Date of Patent: Jan. 13, 2026

(54) DATA PROCESSING METHOD, DEVICE WAKE-UP METHOD, ELECTRONIC DEVICE AND STORAGE MEDIUM

(71) Applicant: Samsung Electronics Co., Ltd., Suwon-si (KR)

(72) Inventors: Xiaoyan Lou, Beijing (CN); Fan Zhang, Beijing (CN); Xiangfeng Meng, Beijing (CN); Liming Song, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 18/473,701

(22) Filed: Sep. 25, 2023

(65) Prior Publication Data
US 2024/0046920 A1 Feb. 8, 2024

Related U.S. Application Data

(63) Continuation of application No. PCT/IB2023/057558, filed on Jul. 26, 2023.

(30) Foreign Application Priority Data

Jul. 26, 2022 (CN) .......................... 202210887903.0

(51) Int. Cl.
*G10L 15/08* (2006.01)
*G10L 25/51* (2013.01)

(52) U.S. Cl.
CPC .............. *G10L 15/08* (2013.01); *G10L 25/51* (2013.01); *G10L 2015/088* (2013.01)

(58) Field of Classification Search
CPC ..................... G10L 15/08; G10L 25/51; G10L 2015/088; G10L 15/16; G10L 2015/0631;
(Continued)

(56) References Cited

U.S. PATENT DOCUMENTS 5,822,728 A 10/1998 Applebaum et al.
9,779,730 B2 10/2017 Hong et al.
(Continued)

FOREIGN PATENT DOCUMENTS

CN 107358951 A 11/2017
CN 110600029 A 12/2019
(Continued)

OTHER PUBLICATIONS

International Search Report and written opinion dated Nov. 3, 2023, issued in International Application No. PCT/IB2023/057558.
(Continued)

*Primary Examiner* — Abul K Azad
(74) *Attorney, Agent, or Firm* — Jefferson IP Law, LLP

(57) ABSTRACT

A data processing method, a device wake-up method, an electronic device, and a storage medium are provided. In the data processing method, speech to be processed is converted into a keyword phone sequence, and a similar pronunciation sequence generator acquires a similar phone sequence corresponding to the keyword phone sequence in a sequence generation manner, thereby acquiring a first data processed result corresponding to the speech to be processed. By replacing the search method of large-scale speech databases with this generation manner, effective coverage of possible real-life sounds can be achieved with a smaller model, thus improving the ability to distinguish confusing pronunciations. The above data processing method performed by the electronic device can be performed by an artificial intelligence (AI) model.

20 Claims, 29 Drawing Sheets

(58) Field of Classification Search
CPC ............. G10L 2015/223; G10L 15/063; G10L 25/78; G10L 25/27
See application file for complete search history.

(56) References Cited

U.S. PATENT DOCUMENTS

| | | | |
|---|---|---|---|
| 10,748,524 B2 | 8/2020 | Wang et al. | |
| 11,217,245 B2 | 1/2022 | Kaushik et al. | |
| 11,282,528 B2 | 3/2022 | Knudson et al. | |
| 2005/0033575 A1* | 2/2005 | Schneider ............. | G10L 15/142 704/254 |
| 2006/0184365 A1 | 8/2006 | Odell et al. | |
| 2014/0236600 A1* | 8/2014 | Lu ........................ | G10L 15/08 704/251 |
| 2016/0027437 A1 | 1/2016 | Hong et al. | |
| 2017/0004824 A1 | 1/2017 | Yoo et al. | |
| 2018/0075844 A1* | 3/2018 | Kim ..................... | G10L 15/065 |
| 2020/0013390 A1 | 1/2020 | Wang et al. | |
| 2020/0168207 A1 | 5/2020 | Wang et al. | |
| 2021/0050003 A1 | 2/2021 | Zaheer et al. | |
| 2021/0065699 A1* | 3/2021 | Kaushik .................. | G10L 15/16 |
| 2021/0272551 A1 | 9/2021 | Yoo et al. | |
| 2022/0301550 A1* | 9/2022 | Wei ......................... | G10L 25/30 |

FOREIGN PATENT DOCUMENTS

| | | |
|---|---|---|
| CN | 107240401 B | 5/2020 |
| CN | 114299927 A | 4/2022 |
| KR | 10-2017-0003246 A | 1/2017 |
| KR | 10-2018-0028893 A | 3/2018 |
| KR | 10-2016-0013710 A | 11/2021 |

OTHER PUBLICATIONS

Extended European Search Report dated Jan. 27, 2025, issued in European Application No. 23845805.3-1207.

* cited by examiner

FIG. 9 speech to be processed : hi bixby
phone sequence : h ay b ih k s b iy candidate set :
h ey b ih k s b ay
h ey b ih k s b iy
h ey b ih k s b ey
h ay f ih k s b iy candidate set of phone sequence ⇩ generating difference 1  difference 2  difference 3  ......  difference D

| 2 | ay \| ey | 8 | iy \| ay | 0 | 0 | ...... | 0 | 0 |
| 2 | ay \| ey | 0 | 0 | 0 | 0 | ...... | 0 | 0 |
| 2 | ay \| ey | 8 | iy \| ey | 0 | 0 | ...... | 0 | 0 |
| 3 | b \| f | 0 | 0 | 0 | 0 | ...... | 0 | 0 | difference table
wherein, D represents a dimension for measuring the difference

⇩

| 2 | 1 | 8 | 1 | 0 | 0 | 0 | 0 |
| 2 | 1 | 0 | 0 | 0 | 0 | 0 | 0 |
| 2 | 1 | 8 | 1 | 0 | 0 | 0 | 0 |
| 3 | 1 | 0 | 0 | 0 | 0 | 0 | 0 | sequence representation based on the distance in phone level difference (phone 1, phone2)

|   | ay | ey | iy | oy | f |
|---|----|----|----|----|----|
| ay |  |  |  |  |  |
| ey |  |  |  |  |  |
| iy |  |  |  |  |  |
| oy |  |  |  |  |  |
| b |  |  |  |  |  |
| f |  |  |  |  |  |
| t |  |  |  |  |  | distance table

DATA PROCESSING METHOD, DEVICE WAKE-UP METHOD, ELECTRONIC DEVICE AND STORAGE MEDIUM

CROSS-REFERENCE TO RELATED APPLICATION(S)

This application is a continuation application, claiming priority under § 365(c), of an International application No. PCT/IB2023/057558, filed on Jul. 26, 2023, which is based on and claims the benefit of a Chinese patent application number 202210887903.0, filed on Jul. 26, 2022, in the Chinese Intellectual Property Office, the disclosure of which is incorporated by reference herein in its entirety.

TECHNICAL FIELD

The disclosure relates to the field of speech processing technology. More particularly, the disclosure relates to a data processing method, a device wake-up method, an electronic device and a storage medium.

BACKGROUND ART

In some speech processing techniques involving real sound scenario, such as speech wake-up technology, etc., a target speech needs to be detected from various sounds of real life. And the processing results with better performance can keep confusing pronunciations from being judged as the target speech.

Considering the uncertainty and variability of language, speech content, and other factors, it is very difficult to accurately detect the target speech among various sounds. A common practice is to construct a large speech database in which the similarity between each speech and the target speech is compared, so that multiple speeches with the highest similarity can be labeled as confusing pronunciations, and if the multiple speeches are added to the model training, the model's ability to distinguish the confusing pronunciations can be improved.

This requires a large space for storing the speech database. However, even with a larger space, the coverage of reality is not sufficient. Particularly, as the personalization demand of user increases, more and more users desire to customize the speech wake-up word, and then different users may correspond to different target speeches, the speech database cannot meet the effective discrimination of confusing pronunciations of different target speeches.

The above information is presented as background information only to assist with an understanding of the disclosure. No determination has been made, and no assertion is made, as to whether any of the above might be applicable as prior art with regard to the disclosure.

DISCLOSURE

Technical Problem

The purpose of embodiments of the application is to solve the technical problem of confusing pronunciation of the target speech that is difficult to be completely covered by real sounds and cannot be correctly distinguished.

Aspects of the disclosure are to address at least the above-mentioned problems and/or disadvantages and to provide at least the advantages described below. Accordingly, an aspect of the disclosure is to provide a data processing method, a device wake-up method, an electronic device and a storage medium.

Additional aspects will be set forth in part in the description which follows and, in part, will be apparent from the description, or may be learned by practice of the presented embodiments.

Technical Solution

In accordance with an aspect of the disclosure, a data processing method is provided. The data processing method includes acquiring a keyword phone sequence corresponding to a speech to be processed, based on the keyword phone sequence, determining a similar phone sequence of the keyword phone sequence, according to a similar pronunciation sequence generator, and based on the similar phone sequence, generating a first data processed result.

In accordance with another aspect of the disclosure, a data processing method is provided. The data processing method includes acquiring a sequence to be processed, based on the sequence to be processed, determining a target sequence in the sequence to be processed, according to an indication model, and based on the target sequence, generating a second data processed result.

In accordance with another aspect of the disclosure, a device wake-up method is provided. The device wake-up method includes receiving a wake-up registration speech input by a user, based on the wake-up registration speech input by the user, acquiring a wake-up detection model corresponding to the wake-up registration speech, using the acquired wake-up detection model to perform a wake-up detection on a received speech to be detected, and based on the detection result, determining whether to perform a device wake-up processing.

In accordance with another aspect of the disclosure, a data processing device is provided. The data processing device includes a first acquiring module configured to acquire a keyword phone sequence corresponding to a speech to be processed, a first processing module configured to determine a similar phone sequence of the keyword phone sequence based on the keyword phone sequence, according to a similar pronunciation sequence generator, and a second processing module configured to generate a first data processed result based on the similar phone sequence.

In accordance with another aspect of the disclosure, a data processing device is provided. The data processing device includes a second acquiring module configured to acquire a sequence to be processed, a third processing module configured to determine a target sequence in the sequence to be processed based on the sequence to be processed, according to an indication model, and a fourth processing module configured to generate a second data processed result based on the target sequence.

In accordance with another aspect of the disclosure, a device wake-up apparatus is provided. The device wake-up apparatus includes a receiving module configured to receive a wake-up registration speech input by a user, a model acquiring module configured to acquire a wake-up detection model corresponding to the wake-up registration speech, based on the wake-up registration speech input by the user, and a detection module configured to use the acquired wake-up detection model to perform a wake-up detection on a received speech to be detected, and determine whether to perform a device wake-up processing based on the detection result.

In accordance with another aspect of the disclosure, an electronic device is provided. The electronic device includes a memory, a processor and computer programs stored in the memory, wherein, the processor executes the computer programs to implement the operations of the data processing method provided in the embodiments of the present application.

In accordance with another aspect of the disclosure, a non-transitory computer-readable storage medium having computer programs stored therein is provided, wherein the computer programs are executed by the processor to implement the operations of the data processing method provided in the embodiments of the present application.

In accordance with another aspect of the disclosure, a computer program product is provided, wherein the computer program product comprises computer programs which, when executed by a processor, implement the operations of the data processing method provided in the embodiments of the present application.

A data processing method, a device wake-up method, an electronic device and a storage medium are provided in the embodiments of the present application. A speech to be processed is converted into a keyword phone sequence, and a similar pronunciation sequence generator is employed to acquire a similar phone sequence corresponding to the keyword phone sequence in a sequence generation manner, thereby acquiring a first data processed result corresponding to the speech to be processed, such as a confusing pronunciation, etc. By replacing the search method of large-scale speech databases with this generation manner, effective coverage of possible real-life sounds can be achieved with a smaller model, thus improving the ability to distinguish confusing pronunciations.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 9 is a schematic diagram of a pronunciation sequence representation method according to an embodiment of the disclosure;

Throughout the drawings, it should be noted that like reference numbers are used to depict the same or similar elements, features, and structures.

DETAILED DESCRIPTION

Figure 1:
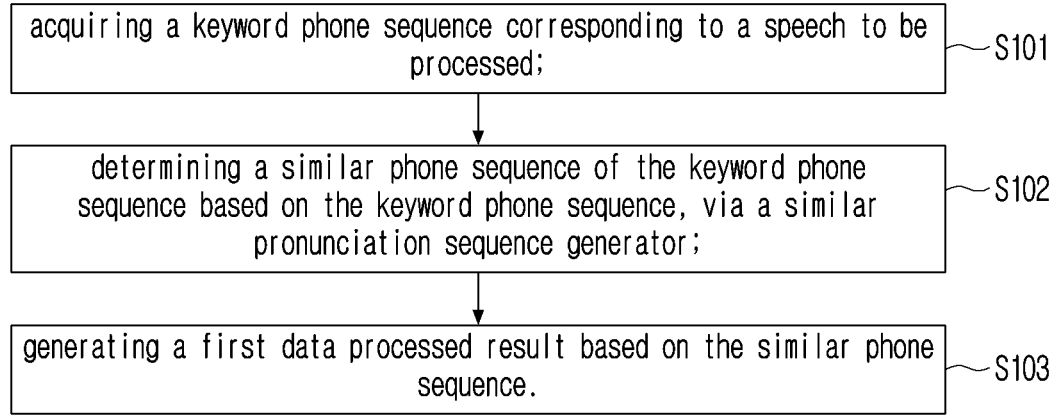
FIG. 1 is a flow diagram of a data processing method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood by those skilled in the art that, the singular form "a," "an" or "the" may be intended to include plural forms as well, unless otherwise stated. It should be further understood that the term "comprise/comprising" or "include/including" used in the embodiments of the present application refers that the corresponding features may be implemented as the presented features, information, data, steps, operations, elements and/or components, but does not exclude that they are implemented as other features, information, data, steps, operations, elements, components and/or combinations thereof supported in the art. It should be understood that, when an element is "connected to" or "coupled to" to another element, this element may be directly connected to or coupled to the another element, or this element may be connected to the another element through an intermediate element. In addition, as used herein, "connection" or "coupling" can comprise wireless connection or coupling. As used herein, the term "and/or" indicates at least one of the items defined by this term. For example, "A and/or B" may be implemented as "A," "B," or "A and B."

In order to make the purpose, technical solutions and advantages of the application clearer, the technical solutions of embodiments of the application and the technical effects resulting from the technical solutions of the application will be described below through the description of several embodiments. It should be noted that the following embodiments can be cross-referenced or combined with each other, and the descriptions of the same terms, similar features and similar implementation operations, etc. in different embodiments will not be repeated.

FIG. 1 is a flow diagram of a data processing method according to an embodiment of the disclosure.

Referring to FIG. 1, a data processing method is provided in the embodiment of the application, the method includes:

Operation S101: acquiring a keyword phone sequence corresponding to a speech to be processed.

The speech to be processed refers to a speech that needs to perform confusion and differentiation processing. For the embodiments of the application, the confusion and differentiation processing is generating the confusing pronunciation of the speech to be processed in listening. Specifically, a set of the confusion sequence of the speech to be processed in listening is generated by acquiring a keyword phone sequence corresponding to a speech to be processed.

The keyword phone sequence refers to a sequence of phones corresponding to keywords in the speech to be processed. The phone is the smallest speech unit divided according to the natural properties of the speech. According to the analysis on the pronunciation action in the syllable, an action constitutes a phone. As an example, the speech "hi, bixby" to be processed can be converted into a phone sequence "hay b ih k s b iy" according to pronunciation rules.

In the embodiment of the application, the keywords of the speech to be processed are converted into the phone sequence. Compared with the conversion into speech representation such as word sequence, this solution does not require to acquire the content of the speech to be processed and the conversion process of the content (require to perform corresponding processing for different languages), which eliminates the interference of information of language type, and can overcome the impact of language type on speech processing, such as larger memory and more computational costs required for processing different types of languages.

In practical applications, the phone sequence is a kind of pronunciation sequence. Thus, in some embodiments, the phone sequence may also be referred to as the pronunciation sequence.

Operation S102: determining a similar phone sequence of the keyword phone sequence based on the keyword phone sequence, according to a similar pronunciation sequence generator.

In the embodiment of the application, the pre-trained similar pronunciation sequence generator aims at generating the confusion phone sequence similar to the input speech, thereby replacing the large speech database used in conventional solution to cover the speech stream in real life. For each output of the pre-trained similar pronunciation sequence generator, that is, a similar phone sequence (not limited to this name, but also other names), it is possible to emphasize the similarity of the pronunciation with the keyword phone sequence.

Operation S103: generating a first data processed result based on the similar phone sequence.

Optionally, the acquired similar phone sequence can be directly used as the confusing pronunciation sequence similar to the speech to be processed, to generate the first data processed result, for example, the acquired pronunciation sequence is converted into the required input format, to acquire the first data processed result, but not limited to this.

Optionally, the acquired similar phone sequence can be processed to generate the first data processed result, for example, a more representative pronunciation sequence is selected from the acquired similar phone sequence according to a predetermined method as the confusing pronunciation sequence similar to the speech to be processed, to generate the first data processed result is generated, but not limited to this.

In the embodiment of the application, the first data processed result may be a negative sample used for training a speech detection model. Generally, the performance of a speech detection model can be judged from two aspects: 1. The ability to correctly detect the existence of the target speech segment from the speech containing the target speech segment; 2. The ability that the confusing pronunciation is not judged as the target speech. Adding confusing pronunciation as negative sample in the training of the speech detection model can improve the ability that the speech detection model distinguishes the confusing pronunciation (ability 2).

Figure 2:
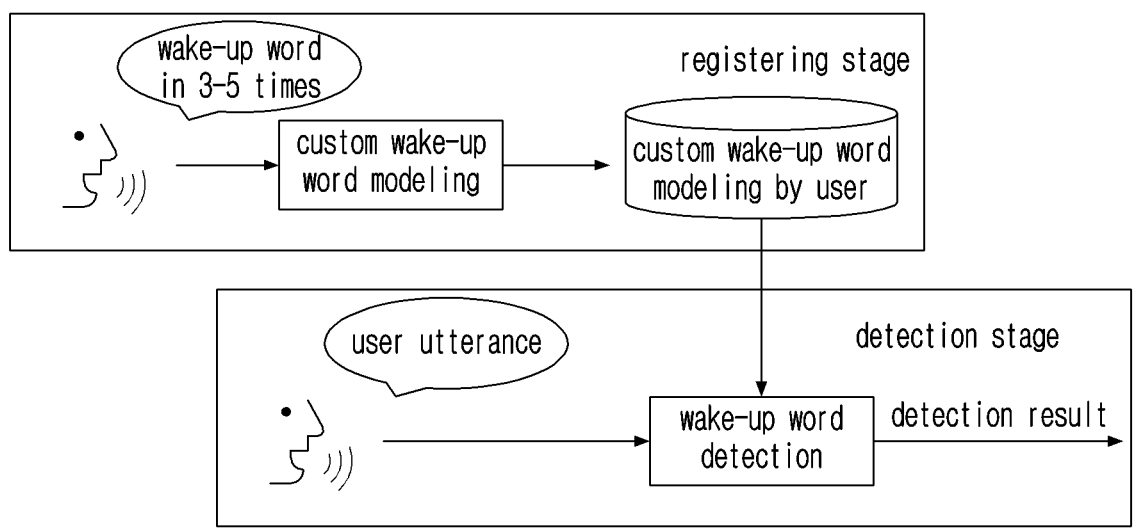
FIG. 2 is a schematic diagram of the registration and detection of custom wake-up words according to an embodiment of the disclosure.

FIG. 2 is a schematic diagram of a registration and detection of custom wake-up words according to an embodiment of the disclosure.

Referring to FIG. 2, taking the speech detection model being a wake-up detection model (on device model) for speech wake-up, and the speech to be processed being a predefined speech (such as a user-entered custom speech wake-up word) as an example, the possible flow includes the following operations: First, the user registers a custom wake-up word on the device (such as entering a wake-up word 3-5 times), and after acquiring the custom wake-up word (that is, the speech to be processed, also referred to as the registered speech), the system performs model training (i.e., modeling) to acquire a personalized wake-up detection model (i.e., a custom wake-up word model by user) corresponding to the wake-up word. This operation can be called as registration; Second, the wake-up detection model corresponding to the trained custom wake-up word is used to detect the wake-up word for the user's utterance. When the system detects the custom wake-up word by user in the collected sound, it will respond. This operation can be called as detection or wake up. For the training of the wake-up detection model, a pronunciation sequence that is similar to the custom wake-up word in listening and easily confused can be acquired, and input into the training of the speech detection model as a negative sample, which can improve the ability to refuse the confusing pronunciation in listening in the detection process of the wake-up detection model (i.e., the ability to distinguish that the confusing pronunciations are not the custom wake-up words by user).

In the data processing method provided by the embodiment of the application, the speech to be processed is converted into a keyword phone sequence, and a similar pronunciation sequence generator is employed to acquire a similar phone sequence corresponding to the keyword phone sequence in a sequence generation manner, thereby acquiring a first data processed result corresponding to the speech to be processed. That is, by replacing the search method of large-scale speech databases with this generation manner, effective coverage of possible real-life sounds can be achieved with a smaller model, thus improving the ability to distinguish confusing pronunciations.

In the embodiment of the application, a feasible implementation for operation S102 is provided, and specifically, operation S102 includes at least one of following operations: determining phone candidates based on the keyword phone sequence; and determining a similar phone sequence for the keyword phone sequence based on the determined phone candidates.

Manner 1: third phone candidates are generated based on the keyword phone sequence and the probability value of pronunciation legitimacy of each phone through the phone sequence generation model. The probability value of pronunciation legitimacy of the phone indicates that the probability of the phone appears after the generated first phone candidates, and determines fourth phone candidates among the third phone candidates based on the second similarity of the phones at position corresponding to the keyword phone sequence.

Optionally, the third phone candidates are generated based on the keyword phone sequence through the phone sequence generation model, wherein, the probability value of pronunciation legitimacy is greater than a third predetermined condition; and fourth phone candidates are determined among the third phone candidates based on the keyword phone sequence and the third phone candidates, wherein, the second similarity is greater than the fourth predetermined condition.

Figure 3:
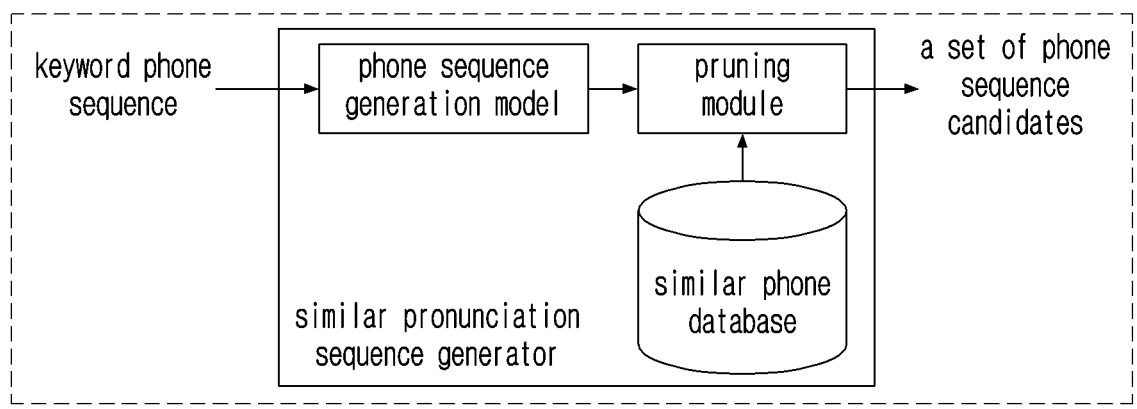
FIG. 3 is a schematic diagram of a structure of a similar pronunciation sequence generator according to an embodiment of the disclosure.

FIG. 3 is a schematic diagram of a structure of a similar pronunciation sequence generator according to an embodiment of the disclosure.

Referring to FIG. 3, in an embodiment of the application, it is shown that a structure of the similar pronunciation sequence generator. The phone sequence generation model is used to generate a phone sequence with high pronunciation legitimacy, that is, a phone with the probability value $p_{cxt}$ of pronunciation legitimacy greater than a third predetermined condition is generated by inserting, deleting or replacing a single phone to determine the phone sequence generated as a natural pronunciation based on the keyword phone sequence, to acquire the third phone candidates, wherein, the phone with the probability value $p_{cxt}$ of pronunciation legitimacy greater than a third predetermined condition refers to a phone with the probability value $p_{cxt}$ of pronunciation legitimacy greater than a third threshold, or the (Top) third predetermined number of phones with the probability value $p_{cxt}$ of pronunciation legitimacy. Those skilled in the art can perform setting according to the actual condition, and the embodiment of the application is not limited here.

Considering the importance of pronunciation legitimacy, such as not violating human physiology, for example, the phones "q" and "k" cannot be pronounced consecutively in sequence, the solution generates a phone sequence with high pronunciation legitimacy, which can ensure high quality of phone sequence candidates.

In the embodiment of the application, the model structure of the phone sequence generation model may be, but not limited to, the model structure of any auto-regressive decoding pre-training model, such as Generative Pre-Training (GPT, generative pre-training model), GPT2, GPT3, multilingual bidirectional and auto-regressive transformers (mBART), etc.

Figure 4A:
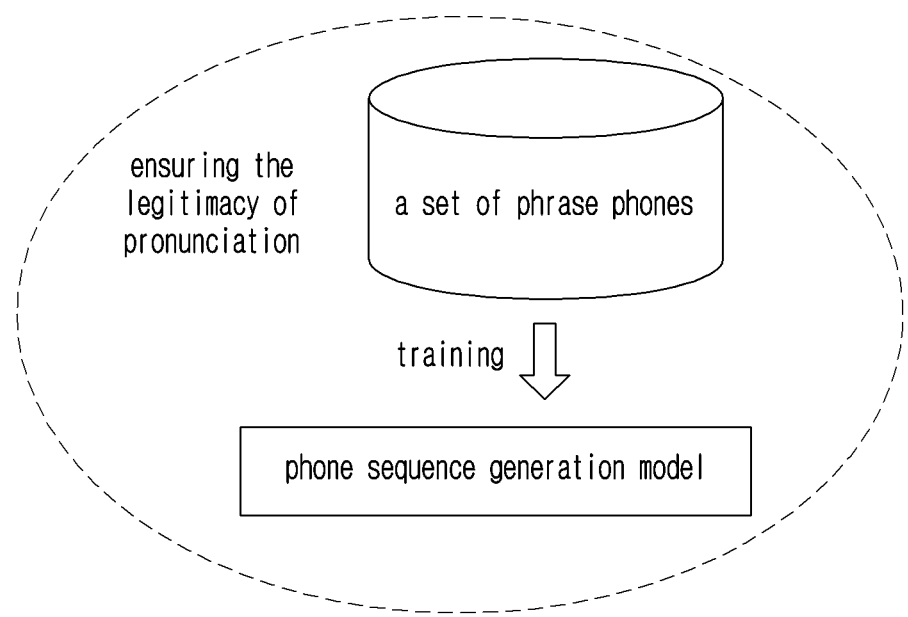
FIG. 4A is a schematic diagram of a construction and role of a phone sequence generation model according to an embodiment of the disclosure.

FIG. 4A is a schematic diagram of a construction and role of a phone sequence generation model according to an embodiment of the disclosure.

Figure 4B:
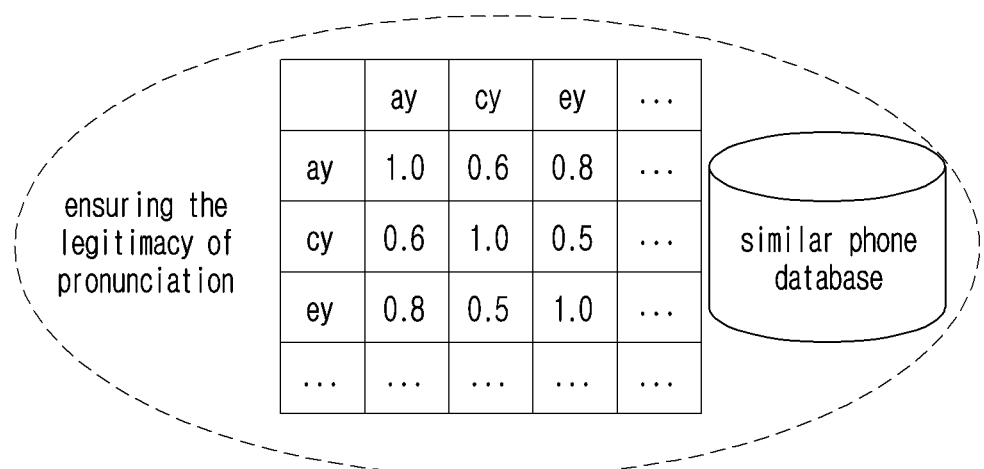
FIG. 4B is a schematic diagram of a construction and role of a similar phone database according to an embodiment of the disclosure.

FIG. 4B is a schematic diagram of a construction and role of a similar phone database according to an embodiment of the disclosure.

Figure 4C:
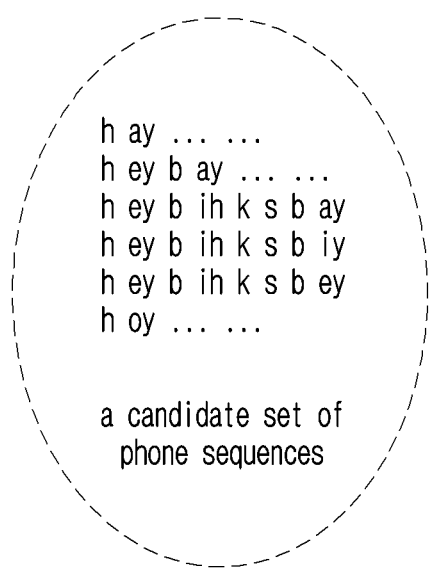
FIG. 4C is a schematic diagram of a phone sequence candidate set according to an embodiment of the disclosure.

FIG. 4C is a schematic diagram of a phone sequence candidate set according to an embodiment of the disclosure.

Figure 4D:
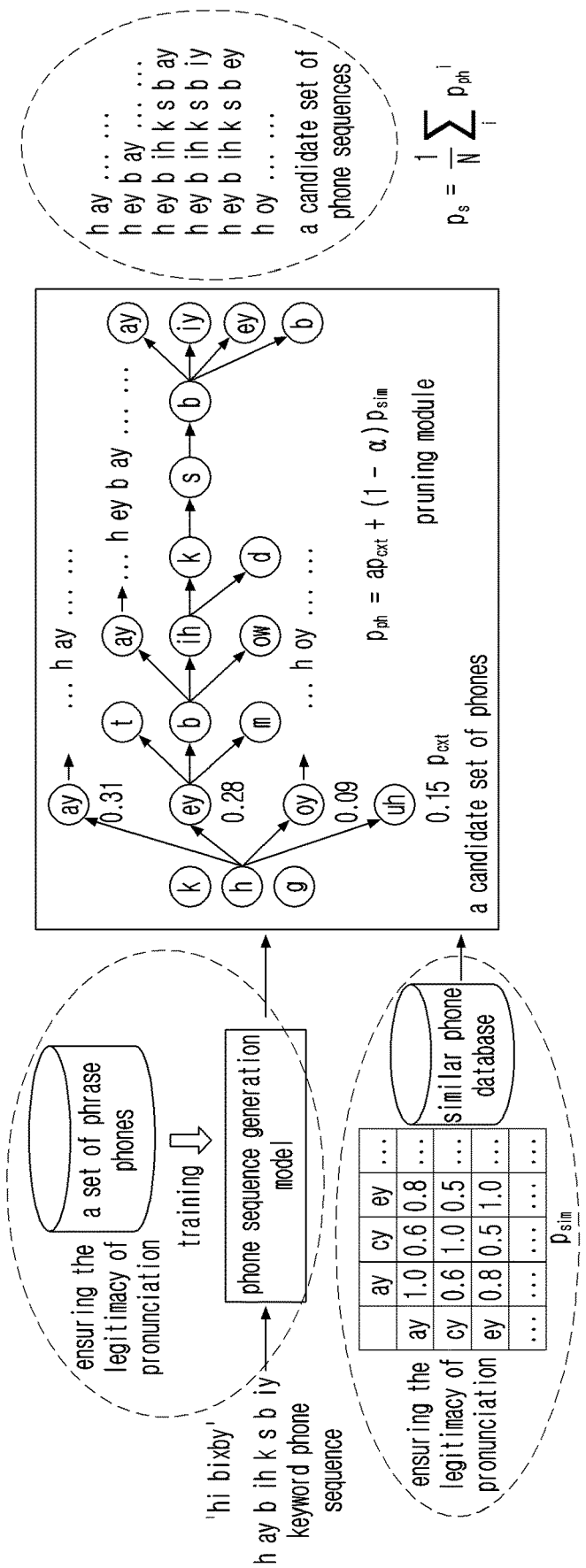
FIG. 4D is a schematic diagram of an execution of a similar pronunciation sequence generator according to an embodiment of the disclosure.

FIG. 4D is a schematic diagram of an execution of a similar pronunciation sequence generator according to an embodiment of the disclosure.

Referring to FIG. 4A, in an embodiment of the application, it is shown that a training set of the phone sequence generation model can be constructed by using the set of correct short phones. In this way, in the learning stage, the phone sequence generation model can learn the correct short phone sequence, so that the phone sequence generation model can be trained to predict the most legitimacy phone according to the phone context, so as to have the ability to output high quality of pronunciation legitimacy phone sequence. In the similar phone sequence generation stage, a high predicted probability indicates a high pronunciation legitimacy.

Further, in the pruning module, a phone similar relationship (such as similarity) information (such as a similar phone matrix or database, also called as a phone similar relationship (or similarity) matrix or database) or a similar phone model (also called as a phone similar relationship (or similarity) matrix or database) can be used to delete the phone sequence with low pronunciation similarity. For example, using the similar phone database, a phone among the third phone candidates having the similarity $p_{sim2}$ greater than a fourth predetermined condition with each phone in the keyword phone sequence (i.e., the second similarity) is determined, to acquire the fourth phone candidates. Similarly, the phone with similarity $p_{sim2}$ greater than the fourth predetermined condition refers to the phone with similarity $p_{sim2}$ greater than the fourth threshold, or the (Top) fourth predetermined number of phones with the similarity $p_{sim2}$. Those skilled in the art can perform setting according to the actual condition, and the embodiment of the application is not limited to here.

Referring to FIG. 4B, in an embodiment of the application, a construction of the similar phone database can refer to the method of constructing a phone similarity matrix in a speech recognition system, but not limited to this, and can also be constructed as a phone similarity model and the like. For example, a speech recognition system can be used to count phones that are easy to identify in error, and take the error statistics as a reference for phone similarity. The higher the mutual error rate of two phones is, the higher the similarity between two phones will be.

The similar phone database can represent the similarity between different phones. An alignment tool (such as a speech recognizer) can be used to align speech segments with phones. Acoustic features are extracted from several speech segments corresponding to each phone, and the duration and the fundamental frequency FO information of phones are also extracted. A clustering method such as K-means is used to perform clustering, so as to calculate the probability value of similarity between phones. Phones can also be classified by phoneme information in linguistics to formulate the transfer relationship between phones.

The solution uses similarity pruning to control the space and number of generated phone sequences.

Through the above two operations, the similar phone sequence generated by the similar pronunciation sequence generator can reflect the legitimacy of phones in the speech to be processed and the possibility of conversion between words. It can not only ensure the quality of the generated phone sequence candidate set (including several phone sequence candidates), as shown in FIG. 4C, but also ensure that the number of phone sequence candidates is controllable.

In the embodiment of the application, the similar phone sequence of the keyword phone sequence may be determined directly based on the determined fourth phone candidates, which may specifically include the following operations: acquiring corresponding first phone sequence candidates based on the determined fourth phone candidates; and determining a similar phone sequence of the keyword phone sequence based on the first phone sequence candidates.

Specifically, determining a similar phone sequence of the keyword phone sequence based on the first phone sequence candidates may include: determining the second candidate probability of each phone sequence among the first phone sequence candidates; determining second phone sequence candidates among the first phone sequence candidates, based on the second candidate probability; and acquiring a similar phone sequence of the keyword phone sequence, based on the second phone sequence candidates.

Optionally, the second candidate probability of each phone sequence in the first phone sequence candidates may be determined based on the probability value of pronunciation legitimacy and/or the second similarity of each phone in the first phone sequence candidates.

Optionally, second phone sequence candidates with the second candidate probability greater than the sixth predetermined condition is determined among the first phone sequence candidates.

As an example, the final candidate probability $p_s$ (i.e., the second candidate probability) of each first phone sequence candidates are calculated by using the pronunciation legitimacy probability value $p_{cxt}$ of each phone and the similarity $p_{sim2}$ between the phone and each phone in the keyword phone sequence, and the phone sequence candidate(s) with lower final candidate probability is/are discarded. Specifically, based on the pronunciation legitimacy probability value $p_{cxt}$ and/or the similarity $p_{sim2}$ of the phone, the second candidate probability $p_s$ of each phone sequence in the first phone sequence candidates is determined, and the phone sequence with the second candidate probability $p_s$ greater than the sixth predetermined condition in the first phone sequence candidates is determined to acquire the second phone sequence candidates, wherein, the phone sequence with the second candidate probability $p_s$ greater than the sixth predetermined condition refers to the phone sequence with the second candidate probability $p_s$ greater than the sixth threshold, or the (Top) sixth predetermined number of phone sequences with the second candidate probability $p_s$, etc. Those skilled in the art can perform setting according to the actual condition, and the embodiment of the application is not limited to here.

Optionally, in the embodiment of the application, determining the similar phone sequence of the keyword phone sequence based on the determined fourth phone candidates may specifically include the operations: determining the first candidate probability of each phone among the fourth phone candidates, based on the pronunciation legitimacy probability value of each phone in the fourth phone candidates and the second similarity; determining the fifth phone candidates among the fourth phone candidates, based on the first candidate probability; and determining the similar phone sequence of the keyword phone sequence, based on the determined fifth phone candidates.

Optionally, after acquiring the first candidate probability of each phone in the fourth phone candidates, fifth phone candidates with the first candidate probability greater than the fifth predetermined condition is determined among the fourth phone candidates, and then based on the determined fifth phone candidates, the similar phone sequence of the keyword phone sequence is determined.

That is, in the pruning module as shown in FIG. 3, the pronunciation legitimacy probability value $p_{cxt}$ of the phone and the similarity $p_{sim2}$ between the phone and each phone in the keyword phone sequence can also be used to calculate the comprehensive candidate probability $p_{ph}$ of each phone (i.e., the first candidate probability), and the phone with lower comprehensive candidate probability $p_{ph}$ is discarded. Specifically, based on the pronunciation legitimacy probability value $p_{cxt}$ and the similarity $p_{sim2}$ of each phone in the fourth phone candidates, the first candidate probability $p_{ph}$ of each phone in the fourth phone candidates are determined. The phone with the first candidate probability $p_{ph}$ greater than the fifth predetermined condition in the fourth phone candidates are determined to acquire the fifth phone candidates, wherein, the phone with the first candidate probability $p_{ph}$ greater than the fifth predetermined condition refers to phone with the first candidate probability $p_{ph}$ greater than the fifth threshold, or the (Top) fifth predetermined number of phones with the first candidate probability $p_{ph}$, etc. Those skilled in the art can perform setting according to the actual condition, and the embodiment of the application is not limited to here.

Optionally, based on the pronunciation legitimacy probability value $p_{cxt}$ and similarity $p_{sim2}$ of each phone in the fourth phone candidates, the manner of determining the first candidate probability $p_{ph}$ of each phone among the fourth phone candidates can adopt but not limited to the following formula:

$$p_{ph}=\alpha p_{cxt}+(1-\alpha)p_{sim2}$$

wherein a is a hyper-parameter that controls the balance between pronunciation legitimacy and pronunciation similarity.

Through the above operations, the quality of the phone sequence candidate set can be further ensured, and the number of phone sequence candidates can be controlled.

In the embodiment of the application, determining the similar phone sequence of the keyword phone sequence based on the determined fifth phone candidates may specifically include the following operations: acquiring corresponding first phone sequence candidate, based on the determined fifth phone candidates; and determining the similar phone sequence of the keyword phone sequence, based on the first phone sequence candidates.

Specifically, determining the similar phone sequence of the keyword phone sequence based on the first phone sequence candidates may include: determining the second candidate probability of each phone sequence among the first phone sequence candidates; determining second phone sequence candidates from the phone sequence candidates, based on the second candidate probability; and acquiring a similar phone sequence of the keyword phone sequence, based on the second phone sequence candidates.

Optionally, based on at least one of the pronunciation legitimacy probability value, the second similarity, and the first candidate probability of each phone in the first phone sequence candidates, the second candidate probability of each phone sequence in the first phone sequence candidates can be determined.

Optionally, second phone sequence candidates with the second candidate probability greater than the sixth predetermined condition is determined from the first phone sequence candidates.

As an example, using the first candidate probability $p_{ph}$ of each phone, the final candidate probability $p_s$ (i.e., the second candidate probability) of each first phone sequence candidates are calculated, and the phone sequence candidate with lower final candidate probability is discarded. Specifically, based on the first candidate probability $p_{ph}$ of the phone, the second candidate probability $p_s$ of each phone sequence in the first phone sequence candidates is determined, and the phone sequence with the second candidate probability $p_s$ greater than the sixth predetermined condition in the first phone sequence candidates is determined, to acquire the second phone sequence candidates, wherein, the phone sequence with the second candidate probability $p_s$ greater than the sixth predetermined condition refers to the phone sequence with the second candidate probability $p_s$ greater than the sixth threshold, or the (Top) sixth predetermined number of phone sequences with the second candidate probability $p_s$, etc. Those skilled in the art can perform setting according to the actual condition, and the embodiment of the application is not limited to here.

Optionally, based on the first candidate probability $p_{ph}$ of the phone, the manner of determining the second candidate probability $p_s$ of each phone sequence among the first phone sequence candidates may adopt but not limited to the following formula:

$$p_s = \frac{1}{N}\sum_i p_{ph}^i$$

wherein i refers to each phone in the phone sequence candidate, and N is the number of different phones between the phone sequence candidate and the keyword phone sequence.

In the embodiment of the application, a complete example of the similar pronunciation sequence generator is given by FIG. 4D, and the parts in FIG. 4D that are same as those in FIGS. 4A to 4C can be referred to the above introduction, and will not be repeated. Referring to FIG. 4D, the specific operations are as follows:

1. Given the keyword phone sequence, the pre-trained phone sequence generation model is used to generate phone candidates with higher pronunciation legitimacy to form a set of phone candidates, wherein the phone output probability of the phone sequence generation model is the pronunciation legitimacy probability value $p_{cxt}$ of phone. The keyword phone sequence 'hay b ih k s b iy' corresponding to the speech to be processed 'hi bixby' shown in FIG. 4D is only for illustration, and the specific processing data is subject to the actual implementation, and this example should not be construed as a limit to the application. For this example, taking the second phone 'ay' of the keyword phone sequence as an example, the phone candidate set ['ay', 'ey', 'oy', 'uh'] with higher legitimacy can be acquired based on the pronunciation legitimacy probability value $p_{cxt}$ of the phone, and the probability values are [0.31, 0.28, 0.15, 0.09], and so on for other phones, which will not be repeated here.

2. In the pruning module, the similar phone database is used to query the similarity $p_{sim2}$ of and the corresponding phone of the keyword phone sequence, in the phone candidate set, and discard the phone candidates with lower similarity. For example, as shown in FIG. 4D, for the second phone 'ay', after acquiring the phone candidate set ['ay', 'ey', 'oy', 'uh'] with higher legitimacy in the first operation, the similarity between the phone in this phone candidate set and the keyword phone 'ay' is queried in the similar phone database, and the phone 'uh' with low pronunciation similarity (light-colored branch) is discarded, that is, the phone 'uh' and the phones at subsequent position are discarded, and so on for other phones, which will not be repeated here.

3. In the pruning module, the comprehensive candidate probability $p_{ph}$ of each phone candidate can also be calculated, and the phone candidates with lower comprehensive candidate probability are discarded, where $p_{ph}=\alpha p_{cxt}+(1-\alpha)p_{sim2}$.

4. The final candidate probability $p_s$ of the phone sequence candidates composed of phone candidates is calculated, and the phone sequence candidates with lower final candidate probability are discarded, where $$p_s = \frac{1}{N}\sum_i p_{ph}^i.$$

N is the number of phones in the phone sequence candidate that are different from the keyword phone sequence. For example, as shown in FIG. 4D, for the phone sequence candidate 'hey bih k s b ay', comparing with the keyword phone sequence 'hay b ih k s b iy', the second phone is different from the last phone, so N=2.

It can be understood that the phone candidate set can be regarded as a classification tree, and different branch paths can form different phone sequence candidates. The pruning module is used to prune the classification tree to filter the phone sequence candidates. The number of phone sequence candidates can be controlled by modifying the values of the third predetermined condition, the fourth predetermined condition, the fifth predetermined condition, and the sixth predetermined condition, etc.

Manner 2: first phone candidates are generated based on the keyword phone sequence and the pronunciation legitimacy probability value of each phone through the phone sequence generation model, and the pronunciation legitimacy probability value of the phone indicates that the probability of phone appears after the generated first phone candidates.

Optionally, first phone candidates with pronunciation legitimacy probability value higher than the first predetermined condition is generated by using a phone sequence generation model, based on the keyword phone sequence.

In the embodiment of the application, the method of a pre-trained phone sequence generation model used for sequence generation can also be used separately from the method of using a similar phone database to generate confusing pronunciation sequences, that is, only the pre-trained phone sequence generation model can be used to generate the similar phone sequences.

Specifically, the phone sequence generation model is used to generate phone candidates with higher pronunciation legitimacy, that is, based on the keyword phone sequence, the phone with the pronunciation legitimacy probability value $p_{cxt}$ greater than the first predetermined condition is generated to acquire the first phone candidates, wherein, the phones with the pronunciation legitimacy probability value $p_{cxt}$ greater than the first predetermined condition refers to the phone with the pronunciation legitimacy probability value $p_{cxt}$ greater than the first threshold, or the (Top) first predetermined number of phones with the pronunciation legitimacy probability value $p_{cxt}$, etc. Those skilled in the art can perform setting according to the actual condition, and the embodiment of the present application is not limited to here.

In the embodiment of the application, the model structure and construction method of the phone sequence generation model may refer to the introduction above, which will not be repeated here.

In the embodiment of the application, determining the similar phone sequence of the keyword phone sequence directly based on the determined first phone candidates may specifically include: acquiring corresponding first phone sequence candidate, based on the determined first phone candidates; and determining the similar phone sequence of the keyword phone sequence, based on the first phone sequence candidates.

Specifically, determining the similar phone sequence of the keyword phone sequence based on the first phone sequence candidates may include: determining the second candidate probability of each phone sequence among the first phone sequence candidates; determining second phone sequence candidates from the phone sequence candidates, based on the second candidate probability; and acquiring a similar phone sequence of the keyword phone sequence, based on the second phone sequence candidates.

Optionally, the second candidate probability of each phone sequence in the first phone sequence candidates may be determined based on the pronunciation legitimacy probability value of each phone among the first phone sequence candidates.

Optionally, second phone sequence candidates with the second candidate probability greater than the sixth predetermined condition is determined among the first phone sequence candidates.

As an example, in the pruning module, the pronunciation legitimacy probability value $p_{cxt}$ of each phone can be used to calculate the final candidate probability $p_s$ (i.e., the second candidate probability) of each first phone sequence candidate, and discard phone sequence candidates with lower final candidate probability. Specifically, based on the pronunciation legitimacy probability value $p_{cxt}$ of the phone, the second candidate probability $p_s$ of each phone sequence in the first phone sequence candidates is determined, and the phone sequence with the second candidate probability $p_s$ greater than the sixth predetermined condition among the first phone sequence candidates is determined, to acquire the second phone sequence candidates, wherein, the phone sequence with the second candidate probability $p_s$ greater than the sixth predetermined condition refers to the phone sequence with the second candidate probability $p_s$ greater than the sixth threshold, or the (Top) sixth predetermined number of phone sequences with the second candidate probability $p_s$, etc. Those skilled in the art can perform setting according to the actual condition, and the embodiment of the application is not limited to here.

Optionally, based on the pronunciation legitimacy probability value $p_{cxt}$ of the phone, the manner of determining the second candidate probability $p_s$ of each phone sequence among the first phone sequence candidates may adopt but not limited to the following formula:

$$p_s = \frac{1}{N}\sum_i p_{cxt}^i$$

wherein i refers to each phone in the phone sequence candidate, and N is the number of different phones between the phone sequence candidate and the keyword phone sequence.

Figure 5:
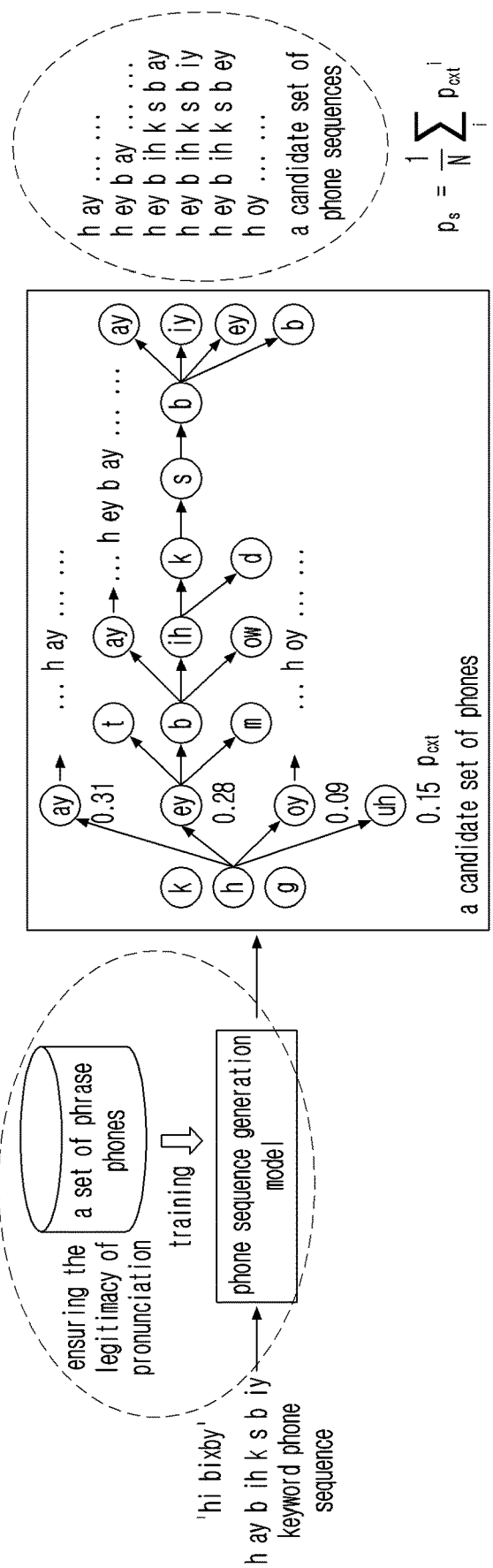
FIG. 5 is a schematic diagram of an execution of another similar pronunciation sequence generator according to an embodiment of the disclosure.

FIG. 5 is a schematic diagram of an execution of another similar pronunciation sequence generator according to an embodiment of the disclosure.

In an embodiment of the present application, a complete example of using a pre-trained phone sequence generation model to generate a confusing pronunciation sequence is given in FIG. 5, wherein parts in FIG. 5 that are same as those in FIGS. 4A and 4C refer to the above introduction, which will not be repeated. Referring to FIG. 5, the specific operations are as follows:

1. Given the keyword phone sequence, the pre-trained phone sequence generation model is used to generate phone candidates with higher pronunciation legitimacy to form phone candidates set, wherein the phone output probability of the phone sequence generation model is the pronunciation legitimacy probability value $p_{cxt}$ of the phone, and wherein, the corresponding keyword phone sequence 'hay bih k s b iy' of the speech 'hi bixby' to be processed shown in FIG. 5 is only for illustration, and the specific processing data is subject to the actual implementation, and this example should not be construed as a limit to the application. For this example, taking the second phone 'ay' of the keyword phone sequence as an example, the phone candidate set ['ay', 'ey', 'oy', 'uh'] with higher pronunciation legitimacy can be acquired based on the pronunciation legitimacy probability value $p_{cxt}$ of the phone, and the probability values are [0.31, 0.28, 0.15, 0.09], respectively. When the phone candidate at the third phone position is generated, the 'uh' with a lower probability value of pronunciation legitimacy is discarded. Through the remaining three phones, the phone prediction at the following positions is performed, and so on for other phones, which will not be repeated here.

2. The final candidate probability $p_s$ of the phone sequence candidates composed of phone candidates is calculated, and the phone sequence candidates with lower final candidate probability are discarded, wherein, $$p_s = \frac{1}{N} \sum_i p_{cxt}^i.$$

Similarly, the number of phone sequence candidates can be controlled by modifying the above-mentioned values of the first predetermined condition, the sixth predetermined condition, and the like.

Manner 3: the second phone candidate is determined based on the keyword phone sequence and the first similarity with the phone at the corresponding position in the keyword phone sequence.

Optionally, second phone candidates that the first similarity with each phone in the keyword phone sequence is greater than a second predetermined condition is determined based on the keyword phone sequence;

In the embodiment of the application, the method for generating the similar phone sequence using the phone similar relationship information can also be used separately from the method for generating sequences using a pre-trained phone sequence generation model to generate the confusing pronunciation sequence. That is, the similar phone sequences can be generated using only the phone similar relationship information.

Optionally, using a similar phone database, the similarity $p_{sim1}$ (i.e., the first similarity) of similar phones of each phone in the keyword phone sequence is queried, and then a phone with a higher similarity $p_{sim1}$ is selected to acquire phone candidates set. As an example, according to $p_{se}^i$=top $p_{sim1}(i,j)$, the similarity of each phone in the phone candidate set is acquired, wherein, i represents each phone in the keyword phone sequence, j represents the similar phone of each phone in the keyword phone sequence, $p_{sim1}(i,j)$ represents the similarity of i, j acquired in the similar phone database, top $p_{sim1}(i, j)$ represents finding out the similarity of K j-s with $p_{sim1}(i,j)$ of i as topK among j-s. That is, based on the keyword phone sequence, the phone that the similarity $p_{sim1}$ with each phone in the keyword phone sequence is greater than the second predetermined condition is determined, to acquire the second phone candidate (the similarity of each phone is $p_{se}^i$, wherein, the phone with the similarity $p_{sim1}$ greater than the second predetermined condition refers to the phone with the similarity $p_{sim1}$ greater than the second threshold, or the (Top) second predetermined number (for example, the above K) of phones with the similarity $p_{sim1}$, etc. Those skilled in the art can perform setting according to the actual condition, and the embodiment of the application is not limited to here.

In the embodiment of the application, the construction method of the similar phone database may refer to the above introduction, which will not be repeated here.

In the embodiment of the application, determining the similar phone sequence of the keyword phone sequence directly based on the determined second phone candidate may specifically include: acquiring corresponding first phone sequence candidate, based on the determined second phone candidate; and determining the similar phone sequence of the keyword phone sequence, based on the first phone sequence candidates.

Specifically, determining the similar phone sequence of the keyword phone sequence based on the first phone sequence candidates may include: determining the second candidate probability of each phone sequence among the first phone sequence candidates; determining second phone sequence candidates from the first phone sequence candidates, based on the second candidate probability; and acquiring a similar phone sequence of the keyword phone sequence, based on the second phone sequence candidates.

Optionally, the second candidate probability of each phone sequence in the first phone sequence candidates may be determined based on the first similarity of each phone among the first phone sequence candidates.

Optionally, second phone sequence candidates with the second candidate probability greater than the sixth predetermined condition is determined among the first phone sequence candidates.

As an example, in the pruning module, the final candidate probability $p_s$ (i.e., the second candidate probability) of each first phone sequence candidate can be calculated using the similarity of each phone $p_{se}^i$, and the phone sequence candidates with lower final candidate probability is discarded. Specifically, based on the phone similarity $p_{se}^i$, the second candidate probability $p_s$ of each phone sequence in the first phone sequence candidates is determined, and in the first phone sequence candidates, the phone sequence with the second candidate probability $p_s$ greater than the sixth predetermined condition is determined to acquire the second phone sequence candidates, wherein, the phone sequence with the second candidate probability $p_s$ greater than the sixth predetermined condition refers to the phone sequence with the second candidate probability $p_s$ greater than the sixth threshold, or the (Top) sixth predetermined number of phone sequences with the second candidate probability $p_s$, etc. Those skilled in the art can perform setting according to the actual condition, and the embodiment of the application is not limited to here.

Optionally, based on the phone similarity $p_{se}^i$, the method for determining the second candidate probability $p_s$ of each phone sequence among the first phone sequence candidates may adopt but not limited to the following formula:

$$p_s = \frac{1}{N} \sum_i p_{se}^i$$

wherein N is the number of different phones between the phone sequence candidate and the keyword phone sequence.

In the embodiment of the application, the space size of the search phone may also be limited by setting the value of N.

Figure 6:
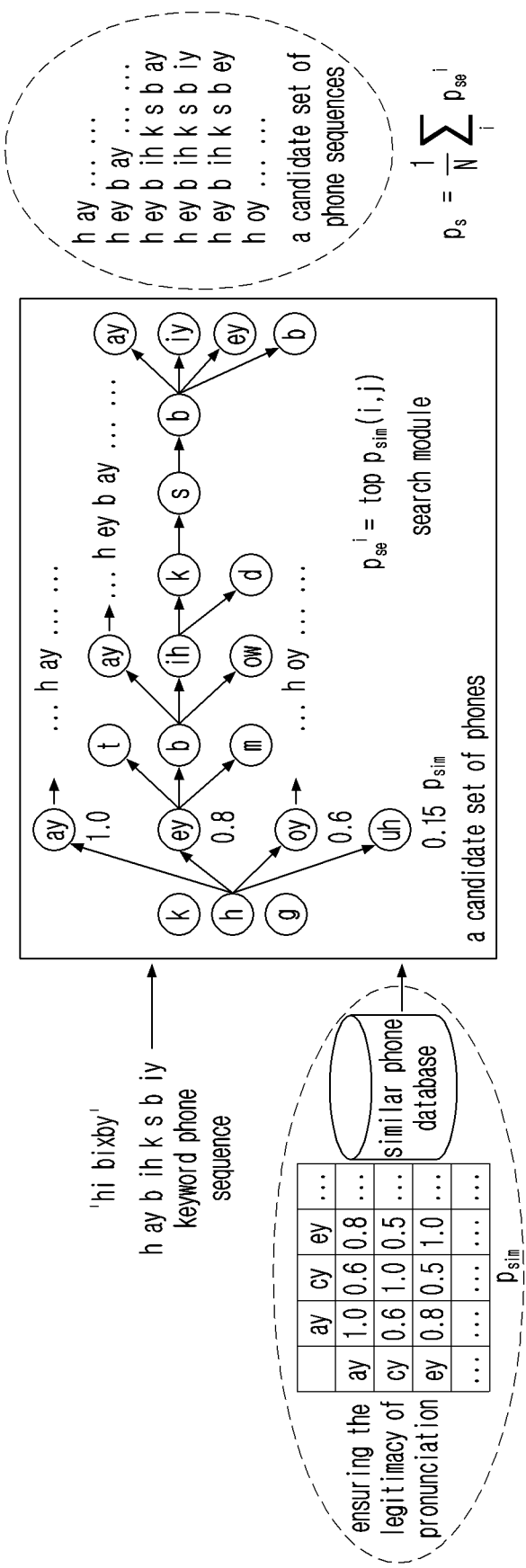
FIG. 6 is a schematic diagram of an execution of yet another similar pronunciation sequence generator according to an embodiment of the disclosure.

FIG. 6 is a schematic diagram of an execution of yet another similar pronunciation sequence generator according to an embodiment of the disclosure.

In the embodiment of the application, a complete example of using phone similarity to generate a confusing pronunciation sequence is given by using FIG. 6. The parts in FIG. 6 that are same as those in FIGS. 4B and 4C refer to the above introduction, which will not be repeated here. Referring to FIG. 6, the specific operations are as follows:

1. Given a keyword phone sequence, the similar phone database is used to query the similarity of the similar phones of each phone in the keyword phone sequence as $p_{se}^i = \text{top } p_{sim1}(i, j)$. Through the search module, the phone candidates with high similarity are searched and replaced to form phone candidates set. The corresponding keyword phone sequence 'hay b ih k s b iy' of the speech 'hi bixby' to be processed shown in FIG. 6 is for illustration only, and the specific processing data is subject to the actual implementation, and this example should not be construed as a limit. For this example, taking the second phone 'ay' of the keyword phone sequence as an example, the phone candidate set ['ay', 'ey', 'oy'] with the highest similarity is queried according to the similar phone database, and the phone 'uh' and so on with the less similar pronunciation are discarded.

2. The final candidate probability $p_s$ of the phone sequence candidates composed of phone candidates is calculating, and the phone sequence candidates with lower final candidate probability are discarded, wherein, $$p_s = \frac{1}{N} \sum_i p_{se}^i.$$

Similarly, the number of phone sequence candidates can be controlled by modifying the above-mentioned values of the second predetermined condition, the sixth predetermined condition, and the like.

It should be noted that each of the above-mentioned first phone sequence candidates represents a combination of phone sequence candidates based on the determined phone candidates, that is, if the determined phone candidates are different, the combined first phone sequence candidates may be different, and the corresponding sixth predetermined condition may also be the same or different. Those skilled in the art can perform setting according to the actual condition, and the embodiment of the application is not limited to here.

Figure 7A:
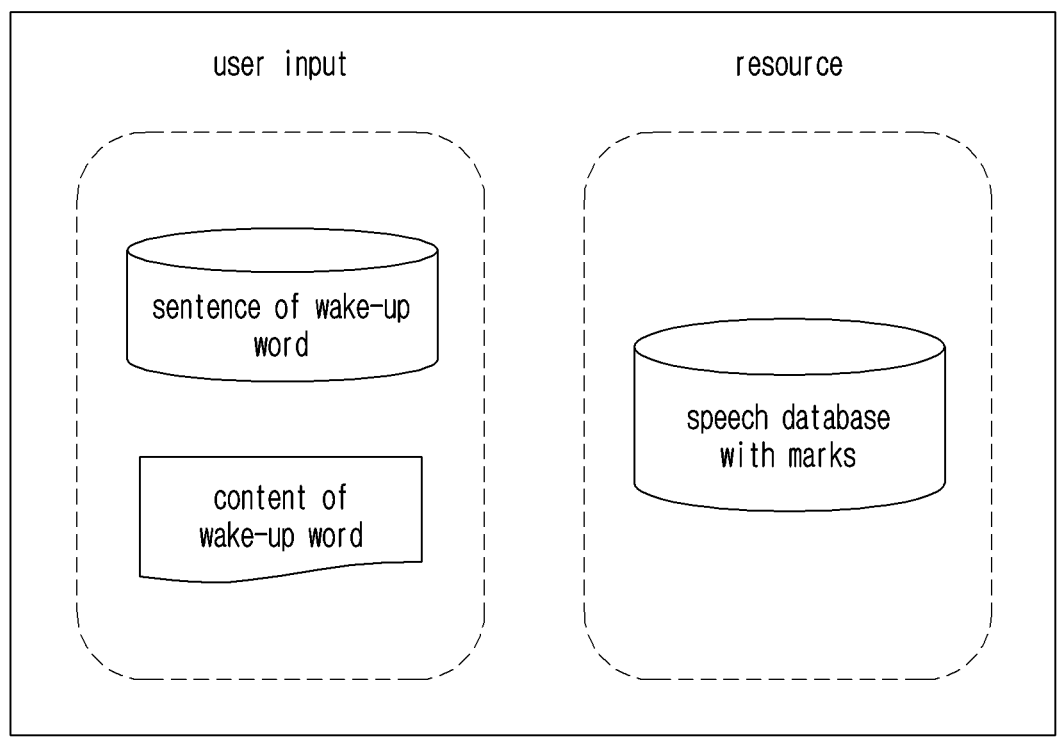
FIG. 7A is a schematic diagram of an input and processing resources required for conventional solutions according to an embodiment of the disclosure.

FIG. 7A is a schematic diagram of an input and processing resources required for solutions according to an embodiment of the disclosure.

Figure 7B:
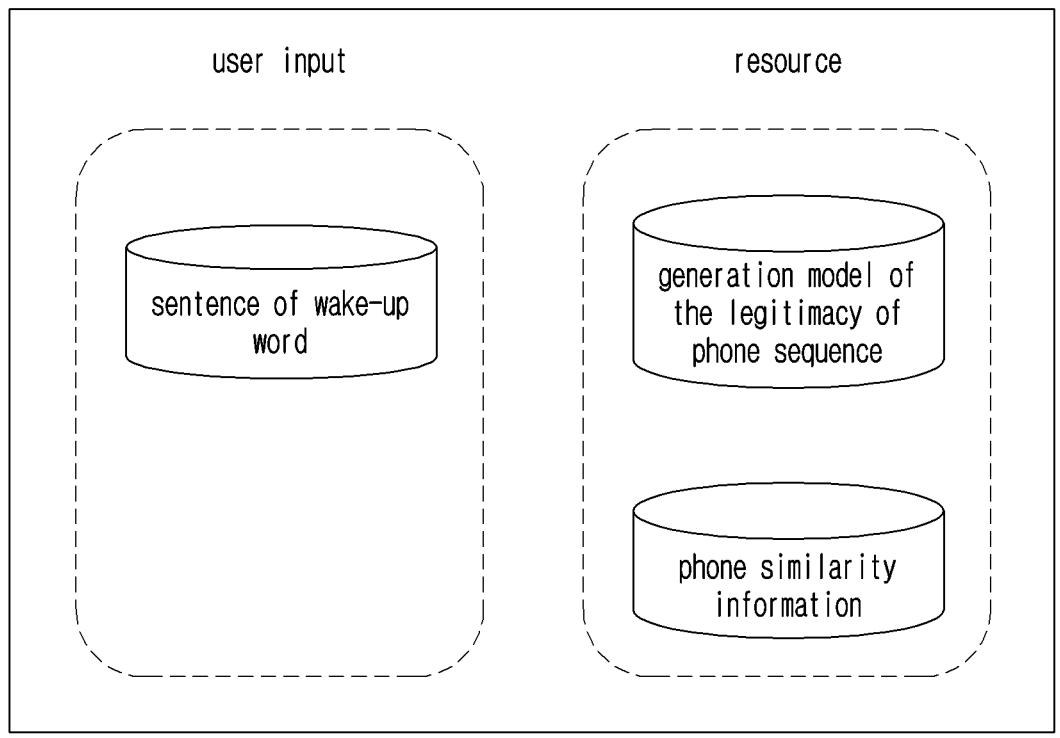
FIG. 7B is a schematic diagram of an input and processing resources required for solutions according to an embodiment of the disclosure.

FIG. 7B is a schematic diagram of an input and processing resources required for solutions according to an embodiment of the disclosure.

Referring to FIGS. A and 7B, the input and processing resources required for the traditional solution and the solution (taking the above method 1 as an example) respectively can be seen in combination with the following Table 1:

TABLE 1

| | | Traditional solution | The solution |
|---|---|---|---|
| Input | Sentence Content | Requirement Required and Associated language | Requirement No requirement |
| Resource | Processing manner | The requirement for large speech databases with annotation causes serious memory requirements. (1) Database is required to be large enough, but still difficult to cover real life; (2) Different databases are required for different languages | Pre-trained phone sequence (legitimacy) generation model and phone similarity information are required, with the advantages of the following: (1) Beyond language (2) High performance (3) Small model, size <10M |

The technical solutions provided by the embodiments of the application generate the similar phone sequences based on the legitimacy of phone sequences and the similarity between phones, and pre-train a model (i.e., similar pronunciation sequence generator) for the legitimacy of intra-word phones and the probability of phone transition between words of a real-life natural language stream to replace large speech database in traditional solution for reliable coverage of real-life speech streams, while the required model size is very small. Compared with the traditional technology that uses the phone database to generate the phone sequence, only the pronunciation similarity is considered, and the pronunciation legitimacy of the generated phone sequence is omitted, the performance of the solution is higher. Because all speech content in real life can be transcribed into phone sequences, the solution is a solution beyond language. In addition, in the pruning module provided by the solution, the phone sequence with low pronunciation similarity is eliminated by using the phone similar relationship information, to ensure the quality of the generated phone sequence candidate set, while ensuring that the number of phone sequence candidates is controllable.

On the other hand, the current common methods for training a custom wake-up word model mainly include: the user enters a custom wake-up speech on his own device, and after acquiring the input wake-up speech, the system transmits the wake-up speech to a separate computing device through the network, completes negative sample search, data processing and model training on this computing device, and transmits the trained model back to the user equipment through the network. The method can utilize sufficient storage resources and computing resources to acquire better performance, for example, a large amount of speech data can be stored for negative sample search. However, since user custom data needs to be transmitted to a separate device, there is a risk of keyword content information leakage.

In the embodiment of the application, considering the privacy protection issue of user, a better method is to perform on device training on a custom wake-up word model on the user equipment. However, at this time, some other problems need to be overcome, such as due to the limitation of the storage space, it cannot support the current large database storage. Secondly, there may be algorithm capacity pressure in the on device training of model. For example, adding all the currently searched sound sequences to the training will increase a great challenge for the on device calculation resources.

It can be understood that the above-mentioned embodiments provided in the application can solve the problems of on device storage and large-scale searches to a certain extent. In addition, the embodiment of the application aims at the limitation of the sample capacity by hardware and algorithms in the on device training, and further proposes a method for selecting confusion samples named as candidate set distillation, to select a more representative minority samples from a number of generated samples (corresponding similar phone sequences). With a small number of samples, it is possible to train a model with similar performance acquired using all samples.

Specifically, operation S103 may include the following operations:
  First Operation: determining a representative phone sequence in the similar phone sequence based on the similar phone sequence through the representative phone sequence extraction network.

Specifically, in the representative phone sequence extraction network, the representative phone sequence in the similar phone sequence is determined based on the similar phone sequence through the indication model.
  Second Operation: generating a first data processed result based on the representative phone sequence.

Figure 8:
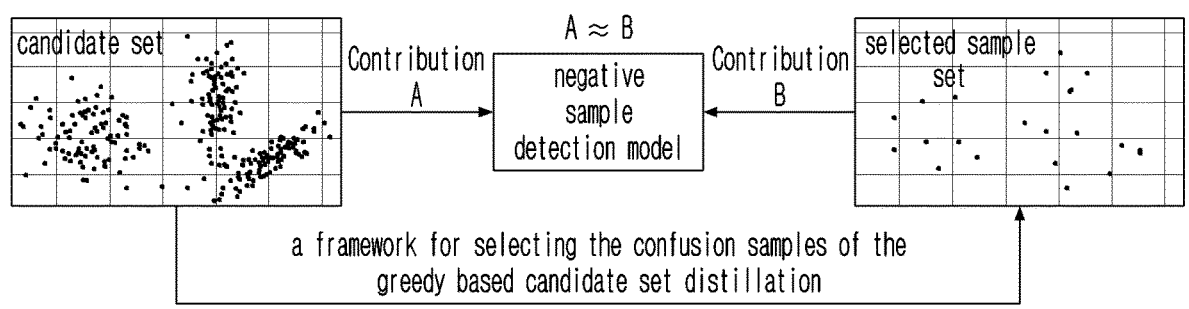
FIG. 8 is a schematic diagram of a greedy algorithm based strategy according to an embodiment of the disclosure.

FIG. 8 is a schematic diagram of a greedy algorithm based strategy according to an embodiment of the disclosure.

For the embodiment of the application, the representative phone sequence extraction network is used to perform the candidate set distillation processing, which aims to select a few more representative pronunciation sequences (that is, representative phone sequences, but not limited to this name, also being other names) from the generated large number of pronunciation sequences (that is, similar phone sequences, which may also be referred to as pronunciation sequence candidates (set) hereinafter, or simply referred to as the candidate set), and the selected small-scale representative pronunciation sequences is used in the negative sample detection model. It should be able to reach a level consistent with or close to the performance of the model trained based on all pronunciation sequence candidates, such as A≈B as shown in FIG. 8, so this solution is a strategy based on a greedy algorithm. That is, the representative phone sequence extraction network is a confusion sample selection framework of the greedy based candidate set distillation, which can also be referred to as the representative sequence distiller.

In an example of a practical application, after the user inputting a wake-up word, the above-mentioned similar pronunciation sequence generator will generate a confused sample candidate set composed of large-scale pronunciation sequence candidates. The inference stage will select a small-scale negative samples from these candidate sets for downstream tasks.

In the embodiment of the application, the selected representative phone sequence should be able to represent all similar phone sequences, so the phone sequences of the representative phone sequence should pay attention to diversification.

In the embodiment of the application, a feasible implementation is provided for the First Operation, which may specifically include the following operations:
  Operation S2011: acquiring the indication information corresponding to the similar phone sequence, based on the similar phone sequence, wherein, the indication information indicates a weight of each phone, which is extracted as a representative phone among the similar phone sequences.
  Operation S2012: determining a representative phone sequence in the similar phone sequence, based on the indication information.

For the embodiment of the application, a method of learning indication information is employed, wherein, a small-scale confusing pronunciation sequences (may also be referred to as samples or candidate samples hereinafter) are selected from the candidate set of pronunciation sequences.

Specifically, the embodiments of the application provide a lightweight learnable indication model for selecting a small number of confusion samples, wherein, the indication model will learn an indicating information, for example, the indicating information may be an indicating vector, and each sample in the candidate set will correspond to an element in the indicating vector. After learning, if the element of the indicating vector corresponding to certain sample is greater than 0 or a certain threshold, it denotes that the sample will eventually be selected.

Optionally, the representation vectors corresponding to all candidate samples can be acquired through representation learning, and based on the representation vectors, an association matrix between all candidate samples can be established, and then input into a neural network model to acquire the indication information.

However, considering that the above-mentioned similar pronunciation sequence generator generates a large number of candidate samples, the number can reach hundreds or even thousands. On the device side, to calculate the correlation matrix between such a large number of candidate samples based on the representation vector of each candidate sample, it needs to consume a lot of computing resources and memory space on the device side. Therefore, the embodiment of the application proposes a new representation method of pronunciation sequences to reduce computation and memory consumption.

Specifically, operation S2011 may specifically include: generating a sequence representation of the similar phone sequence based on the similar phone sequence and the keyword phone sequence, wherein, the sequence representation represents the difference between the similar phone sequence and the keyword phone sequence at the phone level; acquiring the indication information corresponding to the similar phone sequence, based on the sequence representation.

For example, if the keyword phone sequence is "hay b ih k s b iy," and a generated phone sequence candidate is "hey bih k s b ay," the different phones between the two sequences are "ay" and "ey" as well as "iy" and "ay," respectively. In the embodiments of the application, based on the differences between the similar phone sequences and the keyword phone sequences at the phone level, the differences are represented as the sequence representations. That is, the sequence representation is a pronunciation sequence representation manner that can represent the difference at the phone level between sequences. Specifically, the sequence representation may include, but not limited to, a sequence representation vector, a sequence representation matrix, and the like.

Then, based on the sequence representation, the indication information can be acquired, for example, by inputting into a neural network model, the neural network model outputs the indication information. The neural network model includes but not limited to Convolutional Neural Network (CNN), Long Short-Term Memory (LSTM) and other models.

In the embodiment of the application, generating a sequence representation of the similar phone sequence based on the similar phone sequence and the keyword phone sequence may specifically include: determining that the different phones between the similar phone sequence and the keyword phone sequence is at corresponding positions in the keyword phone sequence, and/or the distance between the different phones; generating a sequence representation of the similar phone sequences, based on the position and/or the distance.

Optionally, the speech sequence is represented based on the distance between the keyword phone sequence and the generated pronunciation sequence candidate. The distance is calculated based on the similarity of the phone at the acoustic level, taking into account both the acoustic similarity of the phone and the position of the phone in the speech sequence.

Optionally, determining the distances between the different phones may include: determining the distance between the different phones, based on the preset distance between the phones.

Continuing from the above example, there are two differences between the keyword phone sequence "hay bih k s b iy" and the phone sequence candidate "hey bih k s b ay," which are the second phone position and the eighth phone position. The distance between the two phones at the second phone position is the preset distance between "ay" and "ey," and the distance between the two phones at the eighth phone position is the preset distance between "iy" and "ay."

Then, a sequence representation of the similar phone sequence can be generated based on the position and the distance, and through the neural network model, the indication information is output to select a representative phone sequence in the similar phone sequence, and the indication model outputs the selected representative phone sequence.

FIG. 9 is a schematic diagram of a pronunciation sequence representation method according to an embodiment of the disclosure.

Referring to FIG. 9, there is shown an optional implementation and the specific process is as follows:
1) Input 1: the speech to be processed and/or its keyword phone sequence; Input 2: the generated a candidate set of confusion phone sequences.
2) Based on the two inputs in 1), the difference between each generated phone sequence candidate and the keyword phone sequence is calculated respectively, to generate a difference table. For example, if the keyword phone sequence is "hay b ih k s b iy," and a generated phone sequence candidate is "he y b ih k s b ay," there are two differences in the phones of the two sequences, which are the second phone and the eighth phone. The second phone of these two phone sequences is "ay" and "ey" respectively, and the eighth phone is "iy" and "ay" respectively.

3) Based on the difference table in 2), the distance at the phone level between the keyword phone sequence and all generated phone sequence candidates is calculated. FIG. 9 shows that the distance between phones is queried by combining a pre-built distance table, and the elements in the distance table represent the distance between any two phones. Based on each pair of different phones, the corresponding distance is read in the distance table. In practical applications, the method of determining the distance between phones is not limited to this, and other methods may also be used, such as through a model and so on. The acquired difference table includes the positions of different phones in the similar phone sequence and the keyword phone sequence, and the distance between the two different phones corresponding to each position, as shown in the difference table in FIG. 9. D in FIG. 9 refers to the dimension of difference measurement, that is, the number of different elements that can be measured. In practical application, those skilled in the art can set the value of D according to the actual condition, and the embodiment of the application is not limited to here.
4) Based on the difference table in 3), the sequence representation based on the difference (distance) at phone level can be acquired, for example, the sequence representation can be acquired by direct conversion based on the content of the difference table. That is, in the sequence representation, the position and distance of the different phones between the similar phone sequence and the keyword phone sequence will be reflected. In the embodiment of the application, by setting D in 3), the acquired sequence representation size can be unified, which is convenient for subsequent calculation processing. The indicative information can then be input based on the sequence representation.
5) Based on the sequence representation in 4), the indication information can be acquired by inputting into the neural network model.

The pronunciation sequence representation method based on the distance at phone level, provided by the embodiments of the application, can greatly simplify the operation process, as well as represent and compare sequences in a fixed-size sequence representation (phone level), and avoids the problem of varying numbers of phone sequence candidates.

Figure 10:
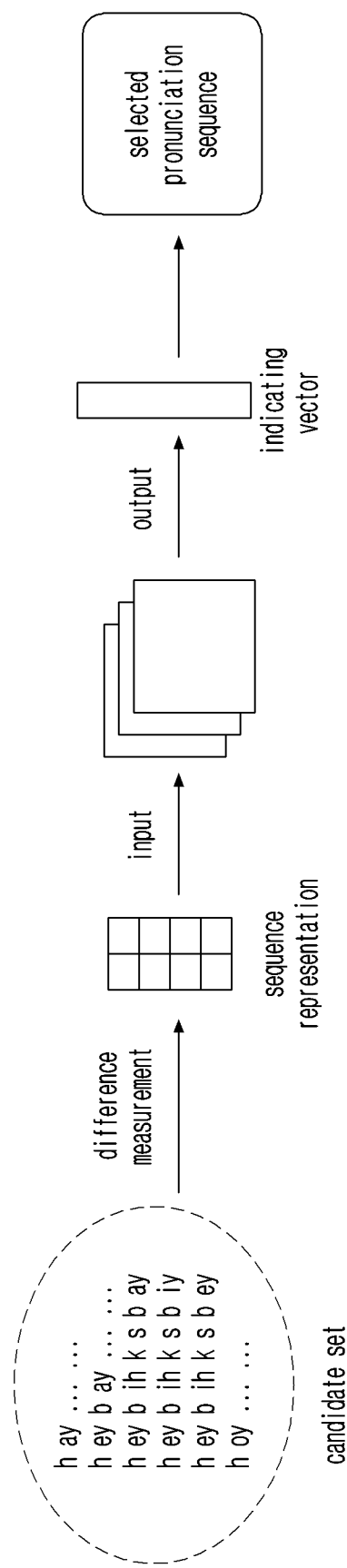
FIG. 10 is a schematic diagram of a selection of phone sequences using an indication model according to an embodiment of the disclosure.

FIG. 10 is a schematic diagram of a selection of phone sequences using an indication model according to an embodiment of the disclosure.

Referring to FIG. 10, a process of using the indication model to select the phone sequence is shown, which mainly includes the following operations:
1) For the input a set of large-scale confusing pronunciation sequence candidates (samples), measuring the difference with the keyword phone sequence. For example, the corresponding sequences are acquired through the pronunciation sequence representation method based on the phone sequence distance proposed in the above embodiment.
2) Inputting the sequence representation into the neural network model, which outputs an indication vector (i.e., indication information).
3) Selecting a specific pronunciation sequence candidate sample based on the element value in the indication vector, for example, by judging whether the value in the indication vector is greater than 0 or a certain threshold.
4) Outputting the selected pronunciation sequence (i.e., the representative phone sequence).

In the embodiment of the application, a lightweight indication model is used to select a small-scale confusion samples, and the computing resources required by the lightweight indication model will be smaller, which is convenient for deploying the model to the user equipment.

Figure 11:
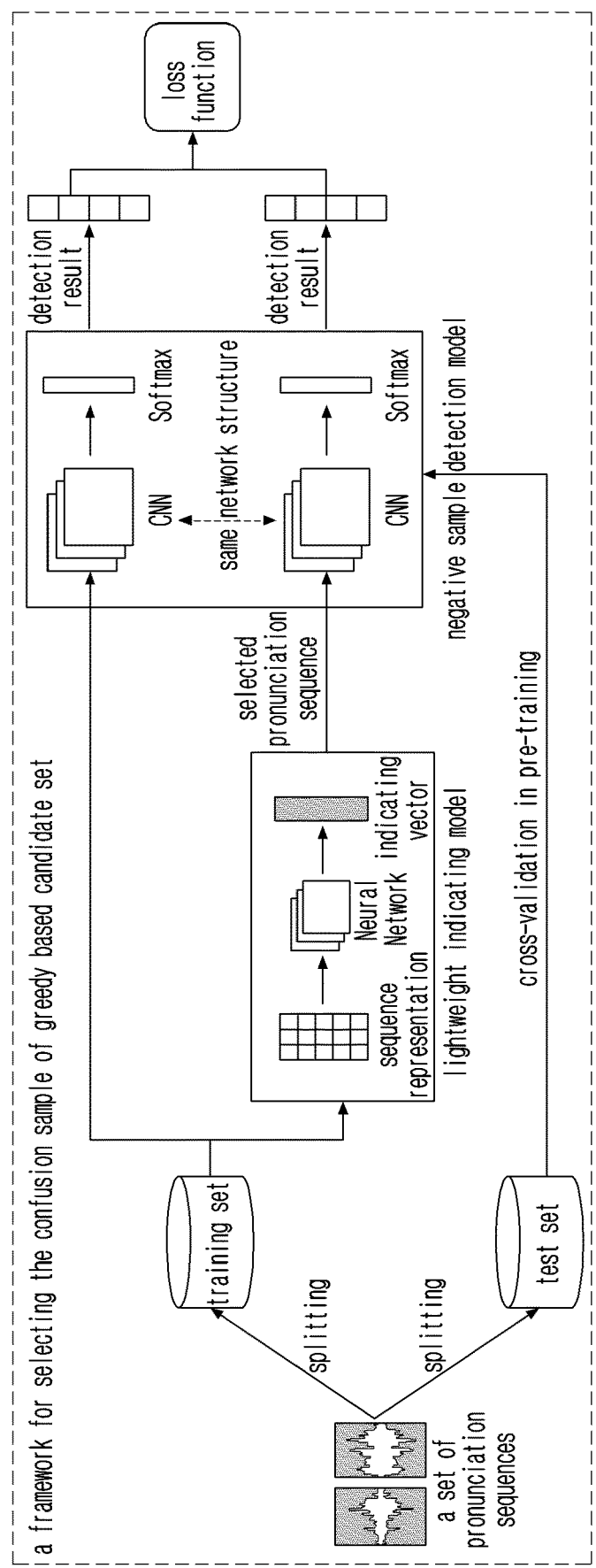
FIG. 11 is a schematic diagram of a framework for selecting confusion samples of a greedy based candidate set distillation according to an embodiment of the disclosure.

FIG. 11 is a schematic diagram of confusion sample selection framework of greedy based candidate set distillation according to an embodiment of the disclosure.

Referring to FIG. 11, the input of the framework is a large number of negative sample pronunciation sequence candidates (i.e., the candidate set in FIG. 11). The purpose of the framework is to select a small number of representative pronunciation sequences (for example, 20) after training, for subsequent training of wake-up detection model on the user equipment. Specifically, the framework can include, but not limited to, at least one of the following:

1) Splitting module, this module is an optional module, which is mainly used to divide the pronunciation sequence in the pronunciation sequence set into two parts, namely the training data set (corresponding to the training set in FIG. 11) and the test data set (corresponding to the test set in FIG. 11).

2) A lightweight learnable indication model, this module is mainly used to select partial pronunciation sequences (i.e., representative phone sequences, corresponding to the selected pronunciation sequences in FIG. 11) from the training data set or the pronunciation sequence set. The specific implementation of the model can be referred to the above introduction, which will not be repeated here.

3) Representation learning module (not shown in FIG. 11), this module is mainly used to perform representation learning on training data set, test data set, selected pronunciation sequence and so on, to acquire the representation vectors of these pronunciation sequences, that is, a continuous value-based vector representation of each pronunciation sequence, to input to subsequent detection model for preparation. Wherein, this module can use some neural network structures for representation learning, including but not limited to Convolutional Neural Network (CNN), Long Short-Term Memory (LSTM) and other models.

4) Two detection models, specifically the Negative Case Detection (NCD) model, are used to detect whether an input sample is a negative sample. The two NCD models can have the same network structure, and the NCD model can adopt various neural network models. FIG. 11 shows the CNN model and the softmax layer, but it should not be understood as a limitation of the NCD model. During the training process, all training data sets or pronunciation sequence sets will be input into one NCD model, and the selected pronunciation sequences output in 2) will be input into another NCD model. Optionally, after training, the test data set split in 1) is also input into the two NCD models for cross-checking. The performance of the NCD model trained with the selected small-scale confusion samples should be consistent with or close to the performance of the NCD model trained with the training data set. That is, the two NCD models should be able to output close detection results, wherein the detection results can be probability values, probability distributions, classification labels, etc.

5) Loss function, is used for training to achieve the above purpose and to ensure the generalization ability of the selected small-scale confusion samples.

In the embodiment of the application, in combination with the above framework, before the First Operation, an online training operation may also be included: based on the similar phone sequence, training the initial indication model in the following manner:

Operation SA: determining the representative phone sequence in the similar phone sequence by the indication model.

The specific implementation of the indication model may refer to the above introduction, which will not be repeated here.

Operation SB: acquiring the first detection result through the first negative sample detection model, based on the similar phone sequence.

The similar phone sequence may be processed by the above-mentioned representation learning module to acquire corresponding representation vector, which is then input to the first NCD model, and the first NCD model outputs the first detection result.

Operation SC: acquiring a second detection result through a second negative sample detection model, based on the representative phone sequence.

Similarly, the representative phone sequence may be processed by the above-mentioned representation learning module to acquire a corresponding representation vector, which is then input to the second NCD model, and the second NCD model outputs the second detection result.

It should be noted that the operation numbers in Operation SB and Operation SC do not constitute a limitation to the sequence of the two operations, that is, the sequence of execution of operations SB and SC may be non-sequential, e.g., they may be executed simultaneously or sequentially.

In the embodiment of the application, the network structures of the first negative sample detection model and the second negative sample detection model are same.

Operation SD: training the indication model, based on the first detection result, the second detection result and the predetermined loss function.

Optionally, the optimization objective of the training end condition is to minimize the loss function.

In the embodiment of the application, the predetermined loss function includes at least one of the following:

(1) A dispersion loss function that measures the difference between the first detection result and the second detection result.

This measurement based on dispersion (such as probability dispersion) measures the dispersion degree of the probability that the representative phone sequence output by the trained indication model and all similar phone sequences are respectively output on the NCD model. If the dispersion degree of the two output detection results is lower, the representative phone sequence that the indication model output can output performance close to the outputs of all similar phone sequences. A typical measurement that can be used to measure this loss is the KL dispersion of the probabilities output by the two NCD models, which is defined as follows:

$$D_{KL}(p\|q) = -\sum_{x} p(x) \log \frac{q(x)}{p(x)}$$

wherein p(x) and q(x) represent two detection results, respectively.

In practical application, other dispersion representations may also be used. Those skilled in the art can perform setting according to the actual condition, and the embodiment of the application is not limited to here.

(2) A mutual information loss function that measures the difference between the representative phone sequences.

This loss function is based on an information bottleneck strategy and measures the differentiation between the representative phone sequences. Generally, the representative phone sequence should be able to represent different types of confusing pronunciation sequences, so it should be avoided to select similar confusing pronunciation sequences as much as possible. This setting will help improve the performance of downstream on device models. The smaller the mutual information of two representative phone sequences is, the greater the difference is. The definition of mutual information is as follows:

$$I(X;Y) = H(X) - H(X|Y) = \sum_{x,y} p(x,y) \log \frac{p(x,y)}{p(x)p(y)}$$

wherein X and Y represent two representative phone sequences, p(x) represents the detection result corresponding to X, p(y) represents the detection result corresponding to Y, and p(x,y) represents the detection result corresponding to both X and Y at the same time.

In the embodiment of the application, by combining the above two loss functions, a higher-quality negative samples of confusing pronunciation sequence can be selected.

Optionally, the initial indication model and/or the two detection models are acquired through offline pre-training. For example, the NCD model and the indication model used for online training are offline pre-trained models, and use the offline pre-trained parameters to initialize parameters thereof (such as weights). The parameters acquired by offline pre-training of the two NCD models may be different.

For the embodiments of the application, the online training adopts a fine-tune method to update and train a lightweight indication model, to adapt to the candidate set generated by the similar pronunciation sequence generator.

Figure 12:
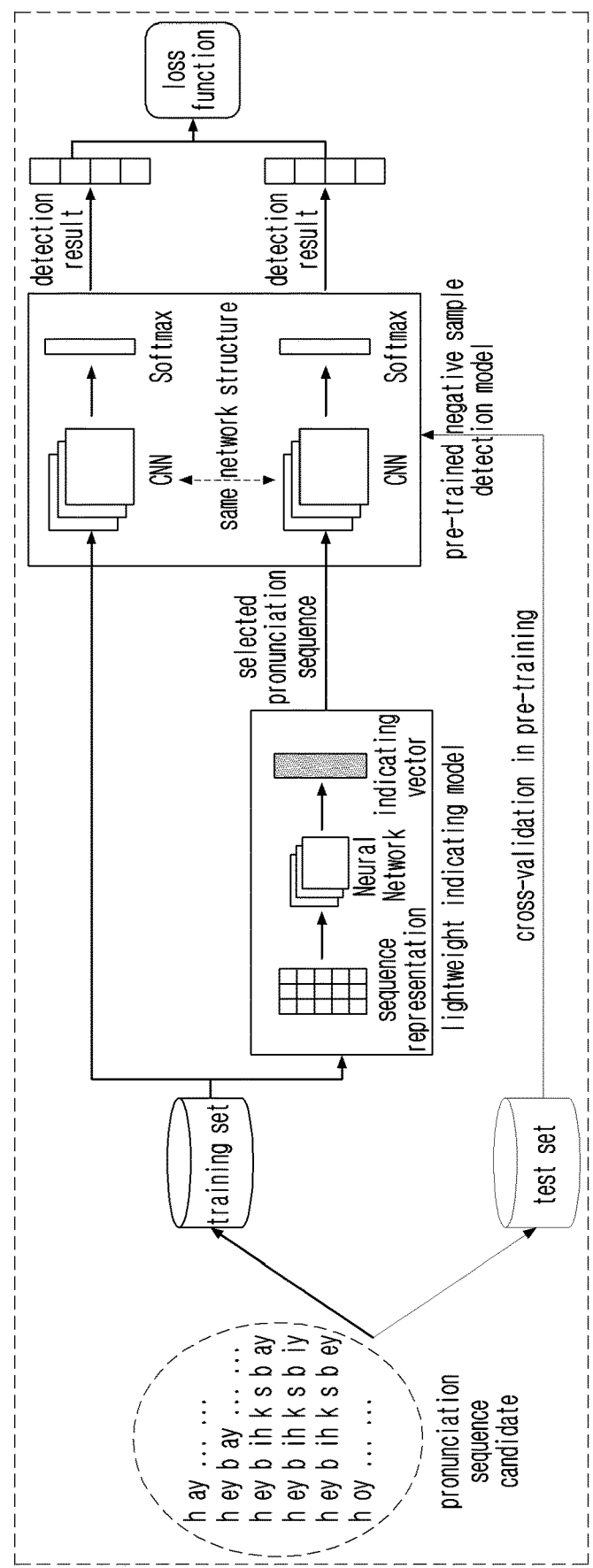
FIG. 12 is a schematic diagram of an online training process according to an embodiment of the disclosure.

FIG. 12 is a schematic diagram of an online training process according to an embodiment of the disclosure.

Referring to FIG. 12, the online training process includes the following processes:

1) Initialization: the parameter weights of indication model as well as the two NCD models trained offline are used to initialize parameters of the three models corresponding to the online training.
2) Input: based on the speech to be processed, through the generation model (similar pronunciation sequence generator) proposed in the embodiment of the application, large-scale confusion samples are generated, that is, the pronunciation sequence candidate of the negative sample, as input, which is also understandable as a processing way on the training set in the framework.
3) On one hand, through the representation learning module, the pronunciation sequence candidates acquire the representation vectors corresponding to the input pronunciation sequence candidates, and the representation vectors are input into the first NCD model (corresponding to the NCD model on the upper side in FIG. 12), and the classification probability value predicted by the NCD model is output.
4) On the other hand, the pronunciation sequence candidates are input into the pre-trained indication model, the selected pronunciation sequences (i.e., representative phone sequences) are output, and through the representation learning module, the selected pronunciation sequences acquires the representation vector of corresponding selected pronunciation sequences, the representation vector of the selected pronunciation sequence is input to the second NCD model (corresponding to the NCD model on the lower side in FIG. 12), and the classification probability value predicted by the NCD model is output.
5) In the online training phase, the optimization objective is to minimize the loss function at the same time, that is, the dispersion of the classification probability values output by the two NCD models, and the mutual information between the selected pronunciation sequences, so as to fine-tune the indication model.

Figure 13:
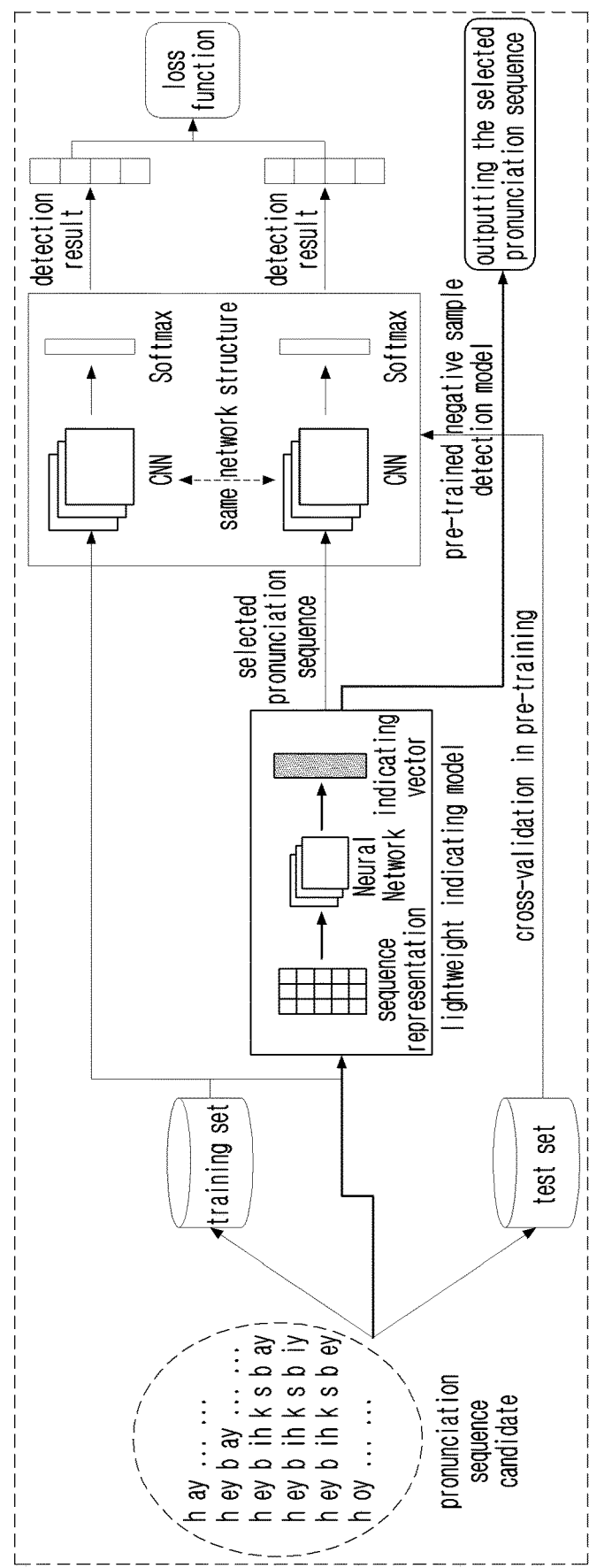
FIG. 13 is a schematic diagram of an online inference process according to an embodiment of the disclosure.

FIG. 13 is a schematic diagram of an online inference process according to an embodiment of the disclosure.

Referring to FIG. 13, on the basis of the indication model acquired by online training and fine-tuning shown in FIG. 12, during the online reasoning process, all generated candidate sets of pronunciation sequences will be input into the indication model, and based on the generated indication vector, the appropriate pronunciation sequence is selected to acquire a small-scale confusion samples. For the specific process, please refer to the introduction to FIG. 10, which will not be repeated here.

As can be seen from the above introduction, the offline training is for three models, namely:

Two detection models, such as two NCD models (introduced below as an example), are mainly used to determine whether a pronunciation sequence is a negative sample, wherein, the two NCD models have the same network structure, but can have different parameter weights. The two NCD models should output consistent or close prediction result for the same input test data.

A lightweight indicator model, is mainly used for processing large-scale data.

The parameters of the three models can be used to initialize the corresponding three online models.

Optionally, the first negative sample detection model is acquired by training a similar phone sequence candidate set generated by a similar pronunciation sequence generator; and/or, the second negative sample detection model is acquired by training the representative phone sequence candidate set selected in the similar phone sequence candidate set.

As an example, in the offline, the first NCD model can be trained by collecting a batch of wake-up words entered by users, and generating a large amount of negative pronunciation sequence data based on the above-mentioned similar pronunciation sequence generator as a similar phone sequence candidate set. Further, through the representative phone sequence extraction network, the second NCD model is trained by acquiring a small-scale pronunciation sequence negative sample data from a set of the large-scale similar phone sequence candidates, as the selected representative phone sequence candidate set.

Those skilled in the art should understand that the above method of acquiring a phone sequence candidate set for training is only an example, and appropriate changes based on the example can also be applied to the application, so the appropriate changes should also be included in the protection scope of the application.

The embodiment of the application provides an optional offline training method: performed training based on large-scale (pronunciation sequence) negative sample data and small-scale pronunciation sequence negative sample data, respectively. Optionally, the scale of the small-scale data may be based on the number of negative samples of pronunciation sequences finally selected online. Those skilled in the art can perform setting according to the actual condition, and the embodiment of the application is not limited to here.

Figure 14:
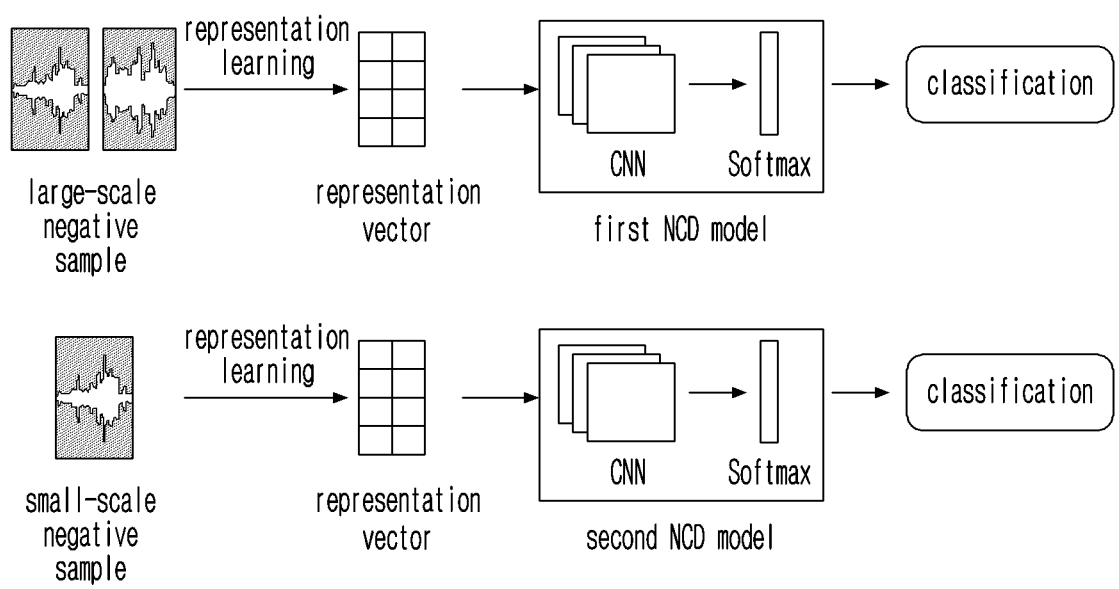
FIG. 14 is a schematic diagram of an offline training process according to an embodiment of the disclosure.

FIG. 14 is a schematic diagram of an offline training process according to an embodiment of the disclosure.

Specifically, referring to FIG. 14, the process of training two NCD models from a large-scale negative sample data and a small-scale negative sample data, respectively, is shown. Taking the first NCD model as an example, the model is trained from a large-scale negative samples of pronunciation sequence. The training process is as follows:

1) The input is a large-scale negative sample data of pronunciation sequence.
2) The negative sample data of the pronunciation sequence is input into a representation learning module of the pronunciation sequence, and the representation vector of the pronunciation sequence is acquired.
3) The representation vector is input to the NCD model. The NCD model is not limited to the CNN model shown in FIG. 14, can use various neural network models, and after passing through the softmax layer, outputs the classification labels (or classification probability).
4) In the pre-training of the task, the loss function used can be various classification loss functions.

The second NCD model is trained based on the small-scale negative sample data of pronunciation sequence. The specific process is the same as that of the first NCD model, which will not be repeated here.

In the embodiment of the application, the offline pre-training of the two NCD models is to acquire an NCD model with good generalization performance, thereby directly using in other offline training tasks and/or online training tasks.

The embodiment of the application provides another optional offline training method, which can be used in combination with the previous optional offline training method. For example, after acquiring a generalized NCD model from the previous optional offline training, the two NCD models are fine-tuned, and a lightweight learnable indication model is trained. Alternatively, the optional offline training method can also be used directly to train two NCD models and a lightweight learnable indication model.

Figure 15:
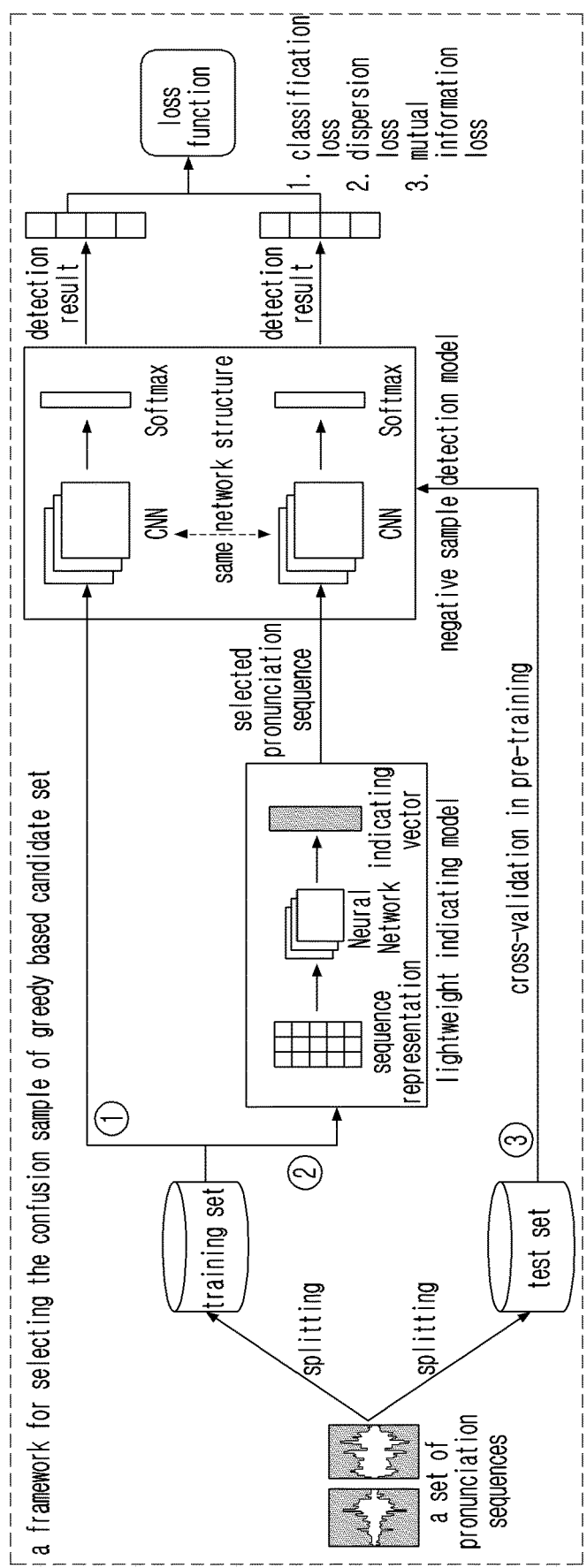
FIG. 15 is a schematic diagram of another offline training process according to an embodiment of the disclosure.

FIG. 15 is a schematic diagram of another offline training process according to an embodiment of the disclosure.

Specifically, referring to FIG. 15, the training process is as follows:

1) Initialization: the two NCD models in FIG. 15 are initialized. Optionally, the weight parameters of the two pre-trained NCD models are used for initialization.
2) The input is a set of large-scale negative sample data of pronunciation sequence, which is divided into a training data set and a test data set for cross-validation.
3) From the training data set, the first path is inputting into a representation learning module to acquire the corresponding representation vector, and then directly inputting into the first pre-trained NCD model, and outputting the classification predicted by the NCD model.
4) The second path is inputting the training data set into a lightweight learnable indication model, outputting an indication vector, and determining which pronunciation sequences should be selected according to the element values of the indication vector. After selecting a small-scale pronunciation sequence, the corresponding representation vector is acquired by inputting to a representation learning module, and then the small-scale pronunciation sequence is input to the second NCD model, and the classification probability predicted by the NCD model is output.
5) The third path is to use the test data to cross-validate the fine-tuned model, that is, to input the test data into a representation learning module to acquire the corresponding representation vector, input two NCD models respectively, and output the two prediction validation classification probability.
6) The loss function is used to measure the probability value output by the NCD model, and the gradient descent method is used to fine-tune the indication model and the two NCD models, wherein, the loss function can specifically adopt the three kinds of loss functions shown in FIG. 15. Optionally, the three loss functions are weighted for measurement.

Figure 16:
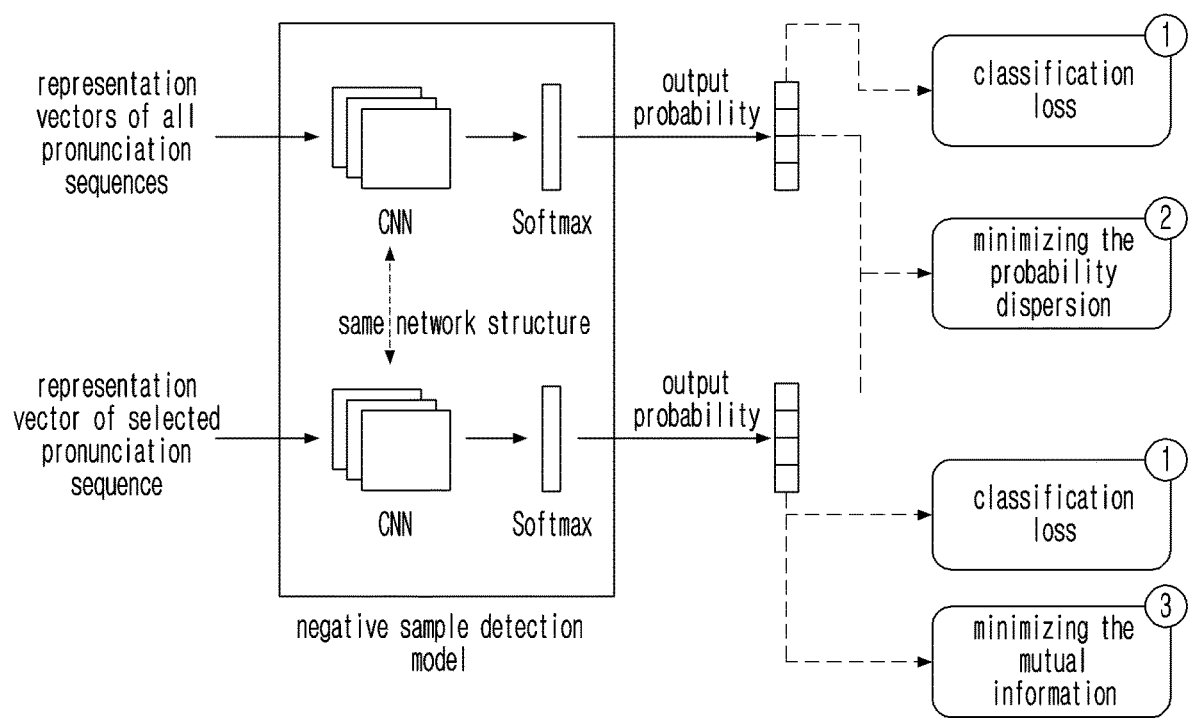
FIG. 16 is a schematic diagram of three loss functions according to an embodiment of the disclosure.

FIG. 16 is a schematic diagram of three loss functions according to an embodiment of the disclosure.

Referring to FIG. 16, in an embodiment of the application, these three loss functions are shown (for the non-detailed part of FIG. 16, please refer to the introduction of FIG. 15), and are respectively defined as follows:

(1) Classification loss function adopted when training two NCD models.

This loss function is used when training two NCD models offline. The main purpose is to train two NCD models with excellent performance respectively, which can be used as the initialization parameters of the online NCD model in the future.

(2) Dispersion loss function for measuring the performance difference of two NCD models on test data.

The loss function measures: the probability that the negative sample detection algorithm (NCD model) trained by the selected pronunciation sequence is output on the test data, and the probability that the negative sample detection algorithm (NCD model) trained by all pronunciation sequences in the training data set is output on the test data, and the dispersion between the above two probabilities. If the dispersion between the above two probabilities is lower, it denotes that the selected pronunciation sequence can be trained with a performance close to the model that can be trained by all pronunciation sequences in the training data set. The typical dispersion loss function can be referred to the introduction above, which will not be repeated here.

(3) A mutual information loss function that measures the difference between the selected pronunciation sequences.

The loss function measures the difference between the representation vectors of the selected pronunciation sequences. It can be seen from the above introduction that the selected pronunciation sequences should have certain differences and can represent different types of negative samples, that is, similar negative samples cannot be selected. In the embodiment of the application, the mutual information between the representation vectors of the selected pronunciation sequences is used to represent the difference, and the smaller the mutual information of the representation vectors of the two selected pronunciation sequences is, the greater the difference is. For the definition of mutual information, please refer to the above introduction, which will not be repeated here.

In the offline training phase, the purpose of training is to minimize the above loss function.

In the embodiment of the application, through the above loss functions, the purposes of "equal contribution" and "diversification of phone sequences" can be achieved for phone sequences of different scales.

Those skilled in the art should understand that the above two offline training manners are only examples. Appropriate changes based on these training manners or these training manners in combination with other training manners can also be applied to the application, and should also be included within the scope of protection of the application.

Figure 17:
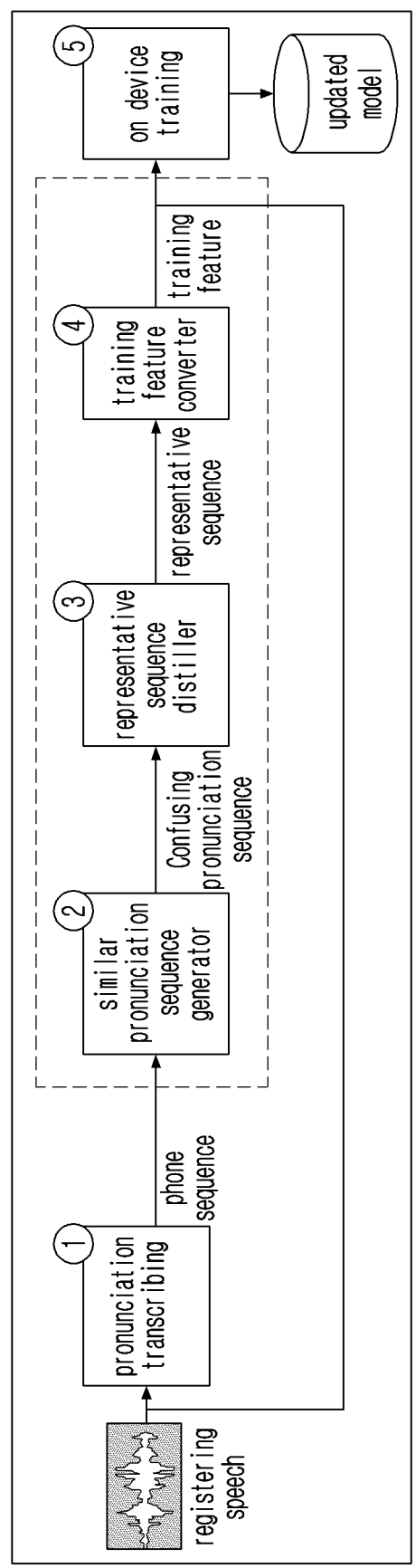
FIG. 17 is a schematic diagram of registering speech training to obtain an on device model according to an embodiment of the disclosure.

FIG. 17 is a schematic diagram of registering speech training to obtain an on device model according to an embodiment of the disclosure.

Referring to FIG. 17, based on at least one embodiment in above, taking the speech to be processed as the registered speech as an example, there is shown an example of acquiring an on device model from a registered speech training is given, which supports running on the user equipment, and the process is as follows:
 (1) Pronunciation transcriber, which converts the registered speech input by the user into a phone sequence,
 (2) Similar pronunciation sequence generator, which acquire a confusing pronunciation sequence (namely, the above-mentioned similar phone sequence) similar to the registered speech through a series of processing according to the phone sequence output by (1).
 (3) An optional representative sequence distiller, which selects a representative pronunciation sequence from the multiple confusing pronunciation sequences output by (2) as the final sample selection result (that is, the above-mentioned representative phone sequence); this module can be used when a user equipment or on device model algorithm is used to limit the number of samples participating in model training is limited, so as to break through the hardware limitations in the online training of the device.
 (4) Training feature converter, which converts the resulting pronunciation sequence into the input format required by the trainer (5) for on device personal model training;
 (5) Trainer, which trains and updates the model for trigger detection on the user equipment based on the data output by (4).

In the embodiments of the application, a solution for generating confusion negative samples beyond language is provided for custom wake-up registration on user equipment, so as to reduce trigger detection errors caused by confusion wake-up words.

In the embodiment of the application, a feasible implementation is provided for feature conversion. Specifically, according to the sample format requirements of the training of the personalized model on the user equipment, the acquired confusing pronunciation sequence is converted into a corresponding format. For example, if the format requirement is a phone sequence, it can be used directly. If the format requirement is an acoustic feature, it converts into the corresponding acoustic feature. If the format requirement is a timing waveform file, it converts into the corresponding waveform file.

Figure 18:
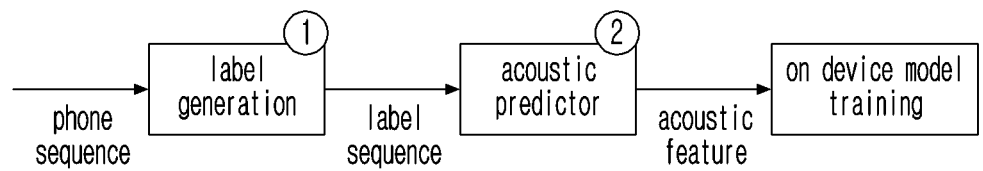
FIG. 18 is a schematic diagram of a process for converting into acoustic features according to an embodiment of the disclosure.

FIG. 18 is a schematic diagram of a process for converting into acoustic features provided according to an embodiment of the disclosure.

Referring to FIG. 18, there is shown a process of converting into acoustic features, and the main process includes: the phone sequence is framed by text analysis and duration model, and the phone sequence is converted into an acoustic label sequence, including phone duration, base frequency, prosody pause and other information. After acquiring the label sequence, a frame-level acoustic feature can be acquired through an acoustic predictor, which can be Mel Frequency Cepstrum Coefficient (MFCC), Mel spectrum, etc., depending on the subsequent on device model training. The acoustic predictor may be a commonly used acoustic model, including but not limited to Hidden Markov Model (HMM), Deep Neural Network (DNN), Recurrent Neural Network (RNN), Tacotron (a speech synthesis model), Fastspeech (a speech synthesis model), Conformer (a deep self-attention transformation network) and other model structures.

Figure 19:
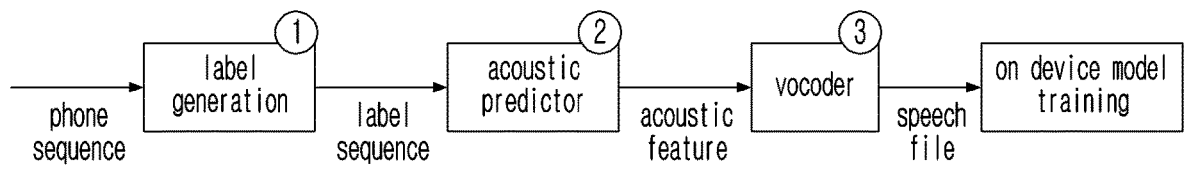
FIG. 19 is a schematic diagram of a process of converting into sound files according to an embodiment of the disclosure.

FIG. 19 is a schematic diagram of a process of converting into sound files according to an embodiment of the disclosure.

Referring to FIG. 19, there is shown a process of converting into a sound file, and, compared with the process of converting into an acoustic feature, after generating the acoustic feature, it is converted into a sound waveform by a vocoder. The vocoder may be, but not limited to, Linear Predictive Coding Net (LPCNet), waveform generation network (WaveNet), and the like.

The method for generating an auditory confusion sequence provided by the embodiment of the application can generate training data as a negative sample on the user equipment according to the speech sequence input by the user to perform the training of the wake-up detection model on the user equipment, so that the acquired detection model after training can break through the limitation of language, which is beneficial to user' pursuit for personalization, such as using more languages or even some meaningless sounds to trigger.

The technical solution provided in the embodiments of the application has the following effects:
 1) Lightweight. This solution uses a model to generate a confusing pronunciation sequence, requires a small memory, and can output representative samples when the number of samples is limited. It also simplifies the representation method (sequence representation) of speech sequences to reduce computation and memory consumption, so that the model and calculation amount are much smaller than the traditional speech database solution, which facilitates the online generation of the training data of the on device custom speech model.
 2) Richer real life performance. This solution not only considers the similarity of phone sequences, but also considers the legitimacy of phone sequences. The legitimacy can be acquired by pre-training of multilingual texts. In addition, compared with the coverage problem of the speech database solution, this solution has better coverage of real pronunciation.
 3) Screening out a small number of samples to acquire similar performance. Training on user equipment sometimes limits computing resources. In response to this challenge, this solution presents a lightweight selection method. The selected pronunciation sequences have similar performance as all sequence candidates, and the selected pronunciation sequences are quite different from each other.
 4) Flexible output format. Various formats of negative sample inputs are supported, depending on the input settings required for subsequent model training.

The data processing methods provided in the embodiments of the application can be used for user terminal equipment, including but not limited to mobile terminal, smart terminal, etc., such as mobile phone, smart phone, tablet computer, notebook computer, personal digital assistant, portable multimedia player, navigation device, headset, smart wearable device (such as watch), Internet of Things (IoT) device, in-vehicle device, car, etc. It can be understood by those skilled in the art that the configurations according to the embodiments of the disclosure can also be applied to stationary type terminal, such as digital television, desktop computer, and the like, in addition to elements particularly used for mobile purposes.

In addition, the data processing method provided by the embodiments of the application can also be used in an independent device, such as a server, etc., and can also achieve the above effects.

Figure 20A:
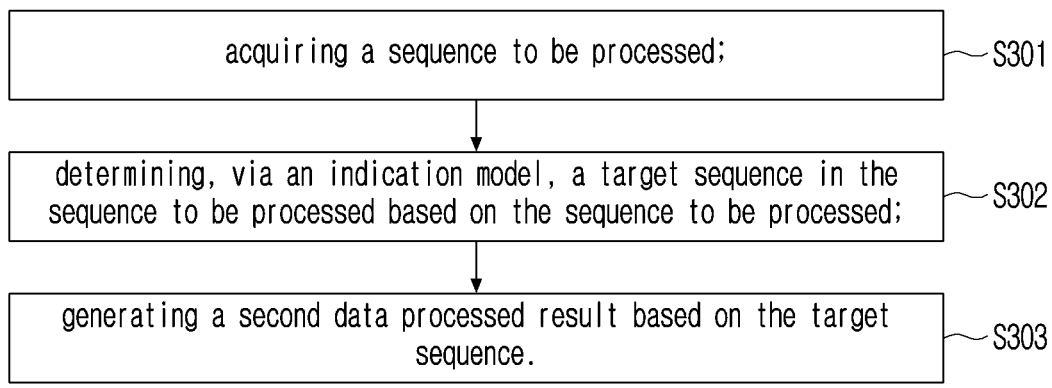
FIG. 20A is a flow schematic diagram of another data processing method according to an embodiment of the disclosure.

FIG. 20A is a flow schematic diagram of another data processing method according to an embodiment of the disclosure.

The embodiment of the application also provides a data processing method, as shown in FIG. 20A, and the method includes:
- Operation S301: acquiring a sequence to be processed.
- Operation S302: determining a target sequence in the sequence to be processed based on the sequence to be processed, according to an indication model.
- Operation S303: generating a second data processed result based on the target sequence.

The sequence to be processed refers to a sequence that needs to be distilled, such as a phone sequence or an acoustic sequence, but not limited thereto.

For the embodiment of the application, the candidate set distillation process is performed by using the indication model, which aims to select a small-scale representative target sequences from the sequences to be processed, and the selected small-scale target sequences should be able to reach a level consistent with or close to the performance of a model trained based on all sequences to be processed in the negative sample detection model.

In the embodiment of the application, for the implementation of the indication model, reference may be made to the phone sequence selection process shown in FIG. 10 and a framework for selecting confusion samples of the greedy based candidate set distillation as shown in FIG. 11. The relevant implementation of the framework may refer to the above introduction, which will not be repeated here.

Figure 20B:
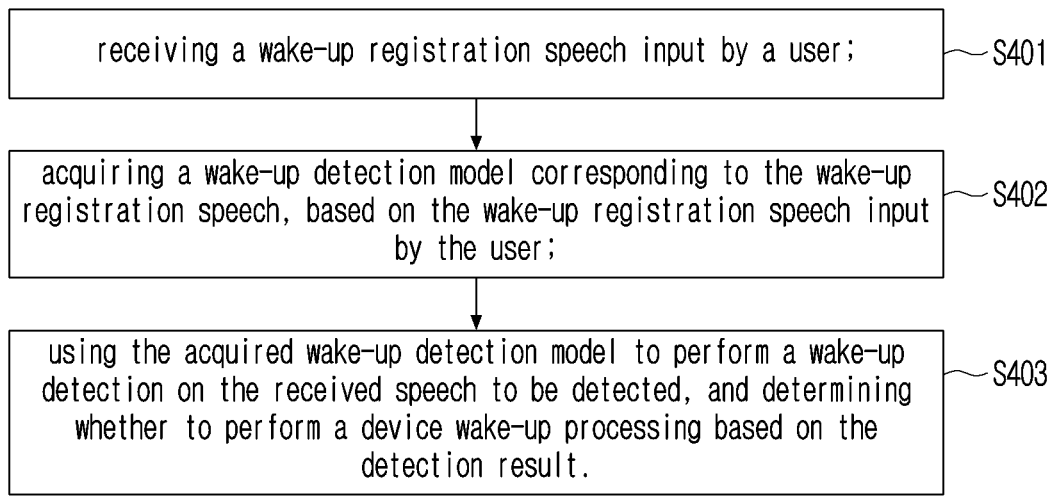
FIG. 20B is a flow schematic diagram of a device wake-up method according to an embodiment of the disclosure.

FIG. 20B is a flow schematic diagram of a device wake-up method according to an embodiment of the disclosure.

The embodiment of the application also provides a device wake-up method, as shown in FIG. 20B, and the method includes:
- Operation S401: receiving a wake-up registration speech input by a user.

For example, as shown in FIG. 2, in the registration stage, the user can register a custom wake-up word on the device according to requirements. In this operation, the wake-up registration speech input by the user is received, for example, a custom wake-up word, but not limited to this.
- Operation S402: acquiring a wake-up detection model corresponding to the wake-up registration speech, based on the wake-up registration speech input by the user.

In the embodiment of the application, the acquired wake-up detection model corresponds to the wake-up registration speech input by the user, that is, a personalized wake-up detection model will be trained based on different wake-up registration speeches, so as to improve the detection precision of custom wake-up words by user.
- Operation S403: using the acquired wake-up detection model to perform a wake-up detection on a received speech to be detected, and determining whether to perform a device wake-up processing based on the detection result.

The wake-up detection model corresponding to the acquired wake-up registration speech input by the user is used to perform wake-up detection on a received speech to be detected (such as the user's utterance), that is, to detect whether the speech to be detected includes the same speech as the wake-up registration speech input by the user, If the detection result is yes, it may be confirmed that the device wake-up process is executed, for example, a response to the user's utterance, but not limited to this.

In the embodiment of the application, a feasible implementation is provided for operation S402, which may specifically include: acquiring the keyword phone sequence corresponding to the wake-up registration speech; determining a similar phone sequence of the keyword phone sequence based on the keyword phone sequence, through a similar pronunciation sequence generator; generating a first data processed result, based on the similar phone sequence; training a wake-up detection model, based on the first data processed result.

In the embodiment of the application, for the manner of generating the first data processed result based on the wake-up registration speech, reference may be made to the above description of each embodiment, and details will not be described here, in order to avoid repetition.

In the embodiment of the application, the generated first data processed result can be used as a negative sample in the training of the wake-up detection model, which can improve the rejection of the auditory confusing pronunciation during the detection process of the wake-up detection model (that is, distinguishing that the confusing pronunciation is not the wake-up registration speech input by user).

Figure 21:
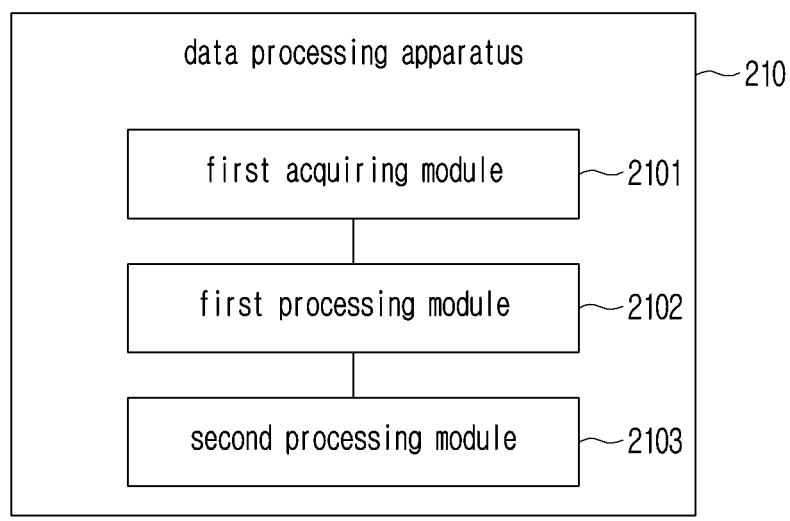
FIG. 21 is a structural schematic diagram of a data processing apparatus according to an embodiment of the disclosure.

FIG. 21 is a structural schematic diagram of a data processing apparatus according to an embodiment of the disclosure.

An embodiment of the application provides a data processing apparatus. Referring to FIG. 21, a data processing apparatus 210 may include: a first acquiring module 2101, a first processing module 2102, and a second processing module 2103.

The first acquiring module 2101 is configured to acquire a keyword phone sequence corresponding to a speech to be processed.

The first processing module 2102 is configured to determine a similar phone sequence of the keyword phone sequence based on the keyword phone sequence, according to a similar pronunciation sequence generator.

The second processing module 2103 is configured to generate a first data processed result based on the similar phone sequence.

Optionally, when the first processing module 2102 is used to determine a similar phone sequence of the keyword phone sequence based on the keyword phone sequence, according to a similar pronunciation sequence generator, it is specifically configured for:

In at least one of the following manners, determining phone candidates based on the keyword phone sequence, and determining a similar phone sequence of the keyword phone sequence based on the determined phone candidates;

generating the first phone candidates based on the keyword phone sequence and the pronunciation legitimacy probability value of each phone, through the phone sequence generation model, wherein, the pronunciation legitimacy probability value of a phone represents the probability that the phone appears after the generated first phone candidates;

determining second phone candidates based on the keyword phone sequence and the first similarity with the phone at the corresponding position in the keyword phone sequence;

generating third phone candidates based on the keyword phone sequence and the pronunciation legitimacy probability value of each phone, through the phone sequence generation model, and determining fourth phone candidates among the third phone candidates, based on the second similarity with the phone at the corresponding position in the keyword phone sequence.

Optionally, when the first processing module 2102 is used to determine the similar phone sequence of the keyword phone sequence based on the determined fourth phone candidates, it is specifically configured for:

determining the first candidate probability of each phone among the fourth phone candidates based on the pronunciation legitimacy probability value and the second similarity of each phone in the fourth phone candidates;

determining fifth phone candidates among the fourth phone candidates based on the first candidate probability;

determining a similar phone sequence of the keyword phone sequence, based on the determined fifth phone candidates.

Optionally, when the first processing module 2102 is used to determine the similar phone sequence of the keyword phone sequence based on the determined phone candidates, it is specifically configured for:

acquiring the corresponding first phone sequence candidates, based on the determined phone candidates;

determining a similar phone sequence of the keyword phone sequence, based on the first phone sequence candidates.

Optionally, when the first processing module 2102 is used to determine the similar phone sequence of the keyword phone sequence based on the first phone sequence candidates, it is specifically configured for:

determining a second candidate probability of each phone sequence among the first phone sequence candidates;

determining second phone sequence candidates among the first phone sequence candidates based on the second candidate probability;

acquiring a similar phone sequence of the keyword phone sequence, based on the second phone sequence candidates.

Optionally, when the first processing module 2102 is used to determine the second candidate probability of each phone sequence among the first phone sequence candidates, it is specifically configured for:

determining the second candidate probability of each phone sequence among the first phone sequence candidates, based on the pronunciation legitimacy probability value of each phone in the first phone sequence candidates, if the first phone sequence candidates are acquired based on the first phone candidates;

determining the second candidate probability of each phone sequence among the first phone sequence candidates, based on the first similarity of each phone in the first phone sequence candidates, if the first phone sequence candidates are acquired based on the second phone candidates;

determining the second candidate probability of each phone sequence among the first phone sequence candidates, based on the pronunciation legitimacy probability value and/or the second similarity of each phone in the first phone sequence candidates, if the first phone sequence candidates are acquired based on the fourth phone candidates;

determining the second candidate probability of each phone sequence among the first phone sequence candidates, based on at least one of the pronunciation legitimacy probability value, the second similarity and the first candidate probability of each phone in the first phone sequence candidates, if the first phone sequence candidates are acquired based on the fifth phone candidates.

Optionally, when the second processing module 2103 is used to generate the first data processed result based on the similar phone sequence, it is specifically configured for:

determining a representative phone sequence in the similar phone sequence based on the similar phone sequence through the indication model;

generating a first data processed result, based on the representative phone sequence.

Optionally, when the second processing module 2103 is used to determine a representative phone sequence in the similar phone sequence based on the similar phone sequence, it is specifically configured for:

acquiring the indication information corresponding to the similar phone sequence based on the similar phone sequence, wherein, the indication information indicates a weight of each phone, which is extracted as a representative phone among the similar phone sequences;

determining a representative phone sequence among the similar phone sequences, based on the indication information.

Optionally, when the second processing module 2103 is used to acquire the indication information corresponding to the similar phone sequence based on the similar phone sequence, it is specifically configured for:

generating a sequence representation of the similar phone sequence based on the similar phone sequence and the keyword phone sequence, wherein, the sequence representation represents a difference between the similar phone sequence and the keyword phone sequence in a phone level;

acquiring the indication information corresponding to the similar phone sequence, based on the sequence representation.

Optionally, when the second processing module 2103 is used to generate the sequence representation of the similar phone sequence based on the similar phone sequence and the keyword phone sequence, it is specifically configured for:

determining the corresponding positions, of different phones between the similar phone sequence and the keyword phone sequence, in the keyword phone sequence, and/or the distance between the different phones;

generating a sequence representation of the similar phone sequences, based on the positions of the different phones and/or the distance between the different phones.

Optionally, when the second processing module 2103 is used to determine the distance between the different phones, it is specifically configured for:

determining the distance between the different phones, based on the preset distance between phones.

Optionally, the second processing module 2103 is also configured for:
based on the similar phone sequences, training the initial indication model in the following ways:
determining the representative phone sequence in the similar phone sequence by the indication model;
acquiring a first detection result based on the similar phone sequence, through the first negative sample detection model;
acquiring a second detection result based on the representative phone sequence, through the second negative sample detection model;
training the indication model, based on the first detection result, the second detection result and the predetermined loss function.

Optionally, the predetermined loss function includes at least one of the following:
a dispersion loss function that measures a difference between the first detection result and the second detection result;
a mutual information loss function that measures a difference between the representative phone sequences.

Optionally, the first negative sample detection model is acquired by training a similar phone sequence candidate set generated by a similar pronunciation sequence generator.

Additionally, or alternatively, the second negative sample detection model is acquired by training the representative phone sequence candidate set selected in the similar phone sequence candidate set.

Optionally, the network structures of the first negative sample detection model and the second negative sample detection model are same.

Figure 22:
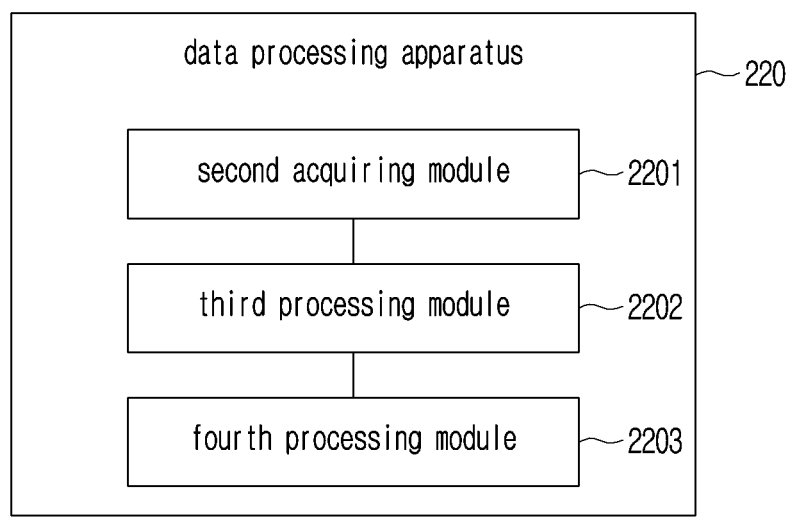
FIG. 22 is a structural schematic diagram of another data processing apparatus according to an embodiment of the disclosure.

FIG. 22 is a structural schematic diagram of another data processing apparatus according to an embodiment of the disclosure.

The embodiment of the application further provides a data processing apparatus. Referring to FIG. 22, a data processing apparatus 220 may include: a second acquiring module 2201, a third processing module 2202, and a fourth processing module 2203.

The second acquiring module 2201 is configured to acquire a sequence to be processed.

The third processing module 2202 is configured to determine a target sequence in the sequence to be processed based on the sequence to be processed, according to an indication model.

The fourth processing module 2203 is configured to generate a second data processed result based on the target sequence.

Figure 23:
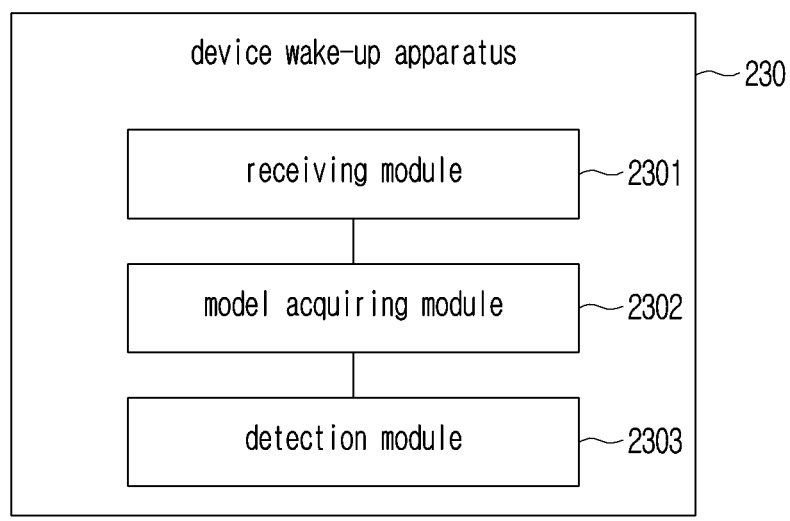
FIG. 23 is a structural schematic diagram of a device wake-up apparatus according to an embodiment of the disclosure.

FIG. 23 is a structural schematic diagram of a device wake-up apparatus according to an embodiment of the disclosure.

The embodiment of the application also provides a device wake-up device. Referring to FIG. 23, a device wake-up apparatus 230 may include: a receiving module 2301, a model acquiring module 2302, and a detection module 2303.

The receiving module 2301 is configured to receive a wake-up registration speech input by a user.

The model acquiring module 2302 is configured to acquire a wake-up detection model corresponding to the wake-up registration speech, based on the wake-up registration speech input by the user.

The detection module 2303 is configured to use the acquired wake-up detection model to perform a wake-up detection on a received speech to be detected, and determining whether to perform a device wake-up processing based on the detection result.

Optionally, when the model acquiring module 2302 is used to acquire the wake-up detection model corresponding to the wake-up registration speech, based on the wake-up registration speech input by the user, it is specifically configured for:
acquiring the keyword phone sequence corresponding to the wake-up registration voice;
determining the similar phone sequence of the keyword phone sequence based on the keyword phone sequence, through the similar pronunciation sequence generator;
generating a first data processed result based on the similar phone sequence;
training a wake-up detection model, based on the first data processed result.

The apparatus in the embodiments of the application can execute the methods provided in the embodiments of the application, and the implementation principles thereof are similar. The actions performed by the modules in the apparatus of the embodiments of the application are same as those in the methods of the embodiments of the application. For the detailed functional description of each module of each device and the beneficial effects produced, reference may be made to the description in the corresponding method shown above, and details are not repeated here.

The apparatus provided in the embodiments of the application may implement at least one module among the multiple modules through Artificial Intelligence (AI) model. AI-related functions may be performed by non-volatile memory, volatile memory, and a processor.

The processor may include one or more processors. At this point, the one or more processors may be general-purpose processors, such as central processing units (CPU), application processors (AP), etc., or pure graphics processing units, such as graphics processing units (GPU), visual processing units (VPU), and/or AI-specific processors, such as neural processing units (NPU).

The one or more processors control the processing of input data according to predefined operating rules or artificial intelligence (AI) models stored in non-volatile memory and volatile memory. The predefined operating rules or artificial intelligence models are provided through training or learning.

Here, providing by learning refers to acquiring a predefined operation rule or an AI model having desired characteristics by applying a learning algorithm to a plurality of learning data. This learning may be performed in the apparatus itself in which the AI according to an embodiment is performed, and/or may be implemented by a separate server/system.

The AI model can contain multiple neural network layers. Each layer has multiple weight values, and the calculation of a layer is performed by the calculation result of the previous layer and the multiple weights of the current layer. Examples of neural networks include, but not limited to, Convolutional Neural Networks (CNN), Deep Neural Networks (DNN), Recurrent Neural Networks (RNN), Restricted Boltzmann Machines (RBM), Deep Belief Networks (DBN), Bidirectional Recurrent Deep Neural Networks (BRDNN), Generative Adversarial Networks (GAN), and Deep Q-Networks.

A learning algorithm is a method of training a predetermined target device (e.g., a robot) using a plurality of learning data to cause, allow or control the target device to make determinations or predictions. Examples of such learning algorithms include, but not limited to, supervised learning, unsupervised learning, semi-supervised learning, or reinforcement learning.

An embodiment of the application provides an electronic device, including a memory, a processor, and computer programs stored in the memory, wherein, the processor executes the above computer programs to implement the operations and corresponding contents of the foregoing method embodiments.

Figure 24:
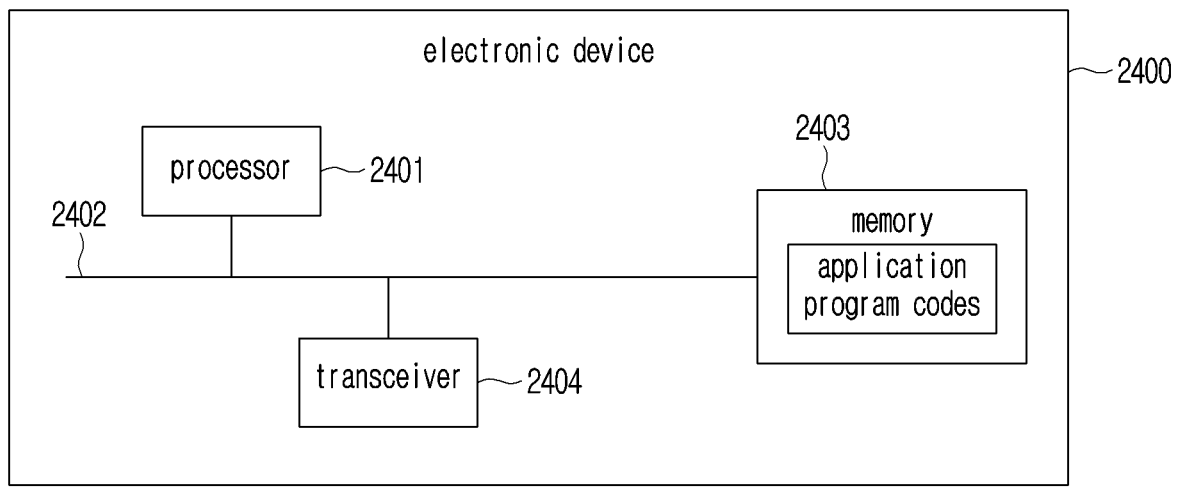
FIG. 24 is a structural schematic diagram of an electronic device according to an embodiment of the disclosure.

FIG. 24 is a structural schematic diagram of an electronic device according to an embodiment of the disclosure.

In an optional embodiment, an electronic device is provided. Referring to FIG. 24, an electronic device 2400 includes: a processor 2401 and a memory 2403. The processor 2401 is connected to the memory 2403, for example, through a bus 2402. Optionally, the electronic device 2400 may further include a transceiver 2404, and the transceiver 2404 may be used for data interaction between the electronic device and other electronic devices, such as data transmission and/or data reception. It should be noted that, in practical applications, the transceiver 2404 is not limited to one, and the structure of the electronic device 2400 does not constitute a limitation to the embodiments of the application.

The processor 2401 may be a Central Processing Unit (CPU), a general-purpose processor, a Digital Signal Processor (DSP), an Application Specific Integrated Circuit (ASIC), a Field Programmable Gate Array (FPGA) or other programmable logic devices, transistor logic devices, hardware components, or any combination thereof. It may implement or execute the various logical blocks, modules and circuits described in connection with this disclosure. The processor 2401 can also be a combination that implements computing functions, such as a combination of one or more microprocessors, a combination of a DSP and a microprocessor, and the like.

The bus 2402 may include a path to transfer information between the components described above. The bus 2402 may be a Peripheral Component Interconnect (PCI) bus or an Extended Industry Standard Architecture (EISA) bus or the like. The bus 2402 can be divided into an address bus, a data bus, a control bus, and the like. For ease of representation, only one thick line is shown in FIG. 24, but it does not mean that there is only one bus or one type of bus.

The memory 2403 may be a Read Only Memory (ROM) or other types of static storage devices that can store static information and instructions, a Random Access Memory (RAM) or other types of dynamic storage devices that can store information and instructions, and can also be an Electrically Erasable Programmable Read Only Memory (EEPROM), Compact Disc Read Only Memory (CD-ROM) or other optical disk storage, compact disk storage (including compressed compact disc, laser disc, compact disc, digital versatile disc, blue-ray disc, etc.), magnetic disk storage media, other magnetic storage devices, or any other medium capable of carrying or storing computer programs and capable of being read by a computer, without limitation.

The memory 2403 is used for storing computer programs for executing the embodiments of the application, and the execution is controlled by the processor 2401. The processor 2401 is configured to execute the computer programs stored in the memory 2403 to implement the operations shown in the foregoing method embodiments.

According to the application, in the data processing method performed by an electronic device, a method for recognizing a user's speech and interpreting the user's intention may receive a speech signal as an analog signal via a speech acquiring device (e.g., a microphone), and use an automatic speech recognition (ASR) model to convert parts of speech into computer-readable text. The user's utterance intent can be acquired by interpreting the transformed text using a natural language understanding (NLU) model. ASR model or NLU model can be artificial intelligence model. The AI model can be processed by an AI-specific processor designed in the hardware architecture specified for AI model processing. AI model can be acquired by training. Here, "acquired by training" denotes that a pre-defined operating rule or an artificial intelligence model configured to perform a desired feature (or purpose) is acquired by training a basic artificial intelligence model with a plurality of pieces of training data by a training algorithm. AI model can include multiple neural network layers. Each of the plurality of neural network layers includes a plurality of weight values, and the neural network calculation is performed by calculation between the calculation result of the previous layer and the plurality of weight values.

Language understanding is a technique for recognizing and applying/processing human language/text, including, for example, natural language processing, machine translation, dialogue systems, question answering or speech recognition/synthesis.

Embodiments of the application provide a computer-readable storage medium, where computer programs are stored in the computer-readable storage medium, and when the computer programs are executed by a processor, the operations and corresponding contents of the foregoing method embodiments can be implemented.

Embodiments of the application further provide a computer program product, including computer programs, and when the computer programs are executed by a processor, the operations and corresponding contents of the foregoing method embodiments can be implemented.

The terms "first," "second," "third," "fourth," "1," "2," and the like (if any) in the description and claims of this application and the above drawings are used for distinguishing similar objects without necessarily describing a particular order or sequence. It should be understood that the data so used are interchangeable under appropriate circumstances so that the embodiments of the application described herein can be practiced in sequences other than those illustrated or described in the text.

It should be understood that, although the respective operations are indicated by arrows in the flowcharts of the embodiments of the application, the execution order of these operations is not limited to the order indicated by the arrows. Unless explicitly stated herein, in some implementation scenarios of the embodiments of the application, the implementation operations in each flowchart may be performed in other sequences as required. In addition, some or all of the operations in each flowchart are based on actual implementation scenarios, and may include multiple sub-operations or multiple stages. Some or all of these sub-operations or stages may be executed at the same time, and each of these sub-operations or stages may also be executed at different times respectively. In scenarios with different execution times, the execution order of these sub-operations or stages can be flexibly configured according to requirements, which is not limited in this embodiment of the application.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device, the method comprising:
   acquiring a keyword phone sequence corresponding to a speech to be processed;
   based on the keyword phone sequence, determining a similar phone sequence similar to the keyword phone sequence, according to a similar pronunciation sequence generator; and
   based on the similar phone sequence, generating a first data processed result,
   wherein the determining of the similar phone sequence similar to the keyword phone sequence comprises:
      based on the keyword phone sequence, determining phone candidates that each meet at least one condition for the phone candidates; and
      based on the phone candidates that each meet the at least one condition for the phone candidates, determining the similar phone sequence, and
   wherein the first data processed result comprises a negative sample used for training a speech detection model.

2. The method of claim 1, wherein the determining of the similar phone sequence similar to the keyword phone sequence comprises at least one of:
   generating first phone candidates based on the keyword phone sequence and a pronunciation legitimacy probability value of each phone, according to a phone sequence generation model, the pronunciation legitimacy probability value of a phone representing a probability that the phone appears after the generated first phone candidates;
   determining second phone candidates based on the keyword phone sequence and a first similarity with a phone at a corresponding position in the keyword phone sequence;
   generating third phone candidates based on the keyword phone sequence and the pronunciation legitimacy probability value of each phone, according to the phone sequence generation model; or
   based on a second similarity with the phone at the corresponding position in the keyword phone sequence, determining fourth phone candidates among the third phone candidates.

3. The method of claim 2, wherein the determining of the similar phone sequence similar to the keyword phone sequence further comprises:
   determining a first candidate probability of each phone among the fourth phone candidates based on the pronunciation legitimacy probability value and the second similarity of each phone in the fourth phone candidates;
   based on the first candidate probability, determining fifth phone candidates among the fourth phone candidates; and
   based on the fifth phone candidates, determining the similar phone sequence.

4. The method of claim 2, wherein the determining of the similar phone sequence similar to the keyword phone sequence further comprises:
   based on at least one of the first phone candidates, the second phone candidates, the third phone candidates, or the fourth phone candidates, acquiring first phone sequence candidates; and
   based on the first phone sequence candidates, determining the similar phone sequence.

5. The method of claim 4, wherein the determining of the similar phone sequence similar to the keyword phone sequence further comprises:
   determining a second candidate probability of each phone sequence among the first phone sequence candidates;
   based on the second candidate probability, determining second phone sequence candidates among the first phone sequence candidates; and
   based on the second phone sequence candidates, determining the similar phone sequence.

6. The method of claim 5, wherein the determining of the second candidate probability of each phone sequence among the first phone sequence candidates comprises:
   in response to the first phone sequence candidates being acquired based on the first phone candidates, determining the second candidate probability of each phone sequence among the first phone sequence candidates based on the pronunciation legitimacy probability value of each phone in the first phone sequence candidates;
   in response to the first phone sequence candidates being acquired based on the second phone candidates, determining the second candidate probability of each phone sequence among the first phone sequence candidates based on the first similarity of each phone in the first phone sequence candidates;
   in response to the first phone sequence candidates being acquired based on the fourth phone candidates, determining the second candidate probability of each phone sequence among the first phone sequence candidates based on at least one of the pronunciation legitimacy probability value or the second similarity of each phone in the first phone sequence candidates; and
   in response to the first phone sequence candidates being acquired based on fifth phone candidates determined among the fourth phone candidates based on a first candidate probability of each phone among the fourth phone candidates, determining the second candidate probability of each phone sequence among the first phone sequence candidates based on at least one of the pronunciation legitimacy probability value, the second similarity, or a first candidate probability of each phone in the first phone sequence candidates, the first candidate probability being determined based on the pronunciation legitimacy probability value and the second similarity of each phone in the fourth phone candidates.

7. The method of claim 1, wherein the generating of the first data processed result comprises:
   based on the similar phone sequence, determining a representative phone sequence in the similar phone sequence, according to an indication model; and
   based on the representative phone sequence, generating the first data processed result.

8. The method of claim 7, wherein the determining of the representative phone sequence in the similar phone sequence comprises:
   based on the similar phone sequence, acquiring indication information corresponding to the similar phone sequence, the indication information indicating a weight of each phone, which is extracted as a representative phone among the similar phone sequence; and
   based on the indication information, determining the representative phone sequence among the similar phone sequence.

9. The method of claim 8, wherein the acquiring of the indication information corresponding to the similar phone sequence comprises:
   based on the similar phone sequence and the keyword phone sequence, generating a sequence representation of the similar phone sequence, the sequence representation representing a difference between the similar phone sequence and the keyword phone sequence in a phone level; and based on the sequence representation, acquiring the indication information corresponding to the similar phone sequence.

10. The method of claim 9, wherein the generating of the sequence representation of the similar phone sequence comprises:

determining at least one of corresponding positions in the keyword phone sequence of different phones between the similar phone sequence and the keyword phone sequence, or a distance between the different phones; and based on at least one of the corresponding positions of the different phones or the distance between the different phones, generating the sequence representation of the similar phone sequence.

11. The method of claim 10, wherein the determining of the distance between the different phones comprises:

based on preset distances between phones, determining the distance between the different phones.

12. The method of claim 7, further comprising:

based on the similar phone sequence, training an initial indication model, wherein the training of the initial indication model comprises:

determining the representative phone sequence in the similar phone sequence, according to the indication model;

based on the similar phone sequence, acquiring a first detection result, according to a first negative sample detection model;

based on the representative phone sequence, acquiring a second detection result, according to a second negative sample detection model; and based on the first detection result, the second detection result, and a predetermined loss function, training the indication model.

13. The method of claim 12, wherein the predetermined loss function includes at least one of:

a dispersion loss function that measures a difference between the first detection result and the second detection result, or a mutual information loss function that measures a difference between representative phone sequences.

14. The method of claim 12, wherein the first negative sample detection model is acquired by training a similar phone sequence candidate set generated according to the similar pronunciation sequence generator, and wherein the second negative sample detection model is acquired by training a representative phone sequence candidate set selected from the similar phone sequence candidate set.

15. An electronic device comprising:

memory storing one or more computer programs; and at least one processor communicatively coupled to the memory, wherein the one or more computer programs, when executed by the at least one processor individually or collectively, cause the electronic device to:

acquire a keyword phone sequence corresponding to a speech to be processed, based on the keyword phone sequence, determine a similar phone sequence similar to the keyword phone sequence, according to a similar pronunciation sequence generator, and based on the similar phone sequence, generate a first data processed result, wherein, to determine the similar phone sequence similar to the keyword phone sequence, the one or more computer programs, when executed by the at least one processor individually or collectively, further cause the electronic device to:

based on the keyword phone sequence, determine phone candidates that each meet at least one condition for the phone candidates, and based on the phone candidates that each meet the at least one condition for the phone candidates, determine the similar phone sequence, and wherein the first data processed result comprises a negative sample used for training a speech detection model.

16. The electronic device of claim 15, wherein, to determine the similar phone sequence similar to the keyword phone sequence, the one or more computer programs, when executed by the at least one processor individually or collectively, further cause the electronic device to at least one of:

generate first phone candidates based on the keyword phone sequence and a pronunciation legitimacy probability value of each phone, according to a phone sequence generation model, the pronunciation legitimacy probability value of a phone representing a probability that the phone appears after the generated first phone candidates, determine second phone candidates based on the keyword phone sequence and a first similarity with a phone at a corresponding position in the keyword phone sequence, generate third phone candidates based on the keyword phone sequence and the pronunciation legitimacy probability value of each phone, according to the phone sequence generation model, or based on a second similarity with the phone at the corresponding position in the keyword phone sequence, determine fourth phone candidates among the third phone candidates.

17. The electronic device of claim 16, wherein, to determine the similar phone sequence similar to the keyword phone sequence, the one or more computer programs, when executed by the at least one processor individually or collectively, further cause the electronic device to:

based on at least one of the first phone candidates, the second phone candidates, the third phone candidates, or the fourth phone candidates, acquire first phone sequence candidates, and based on the first phone sequence candidates, determine the similar phone sequence.

18. The electronic device of claim 17, wherein, to determine the similar phone sequence similar to the keyword phone sequence, the one or more computer programs, when executed by the at least one processor individually or collectively, further cause the electronic device to:

determine a candidate probability of each phone sequence among the first phone sequence candidates, based on the candidate probability, determine second phone sequence candidates among the first phone sequence candidates, and based on the second phone sequence candidates, determine the similar phone sequence.

19. The electronic device of claim 15, wherein, to generate the first data processed result, the one or more computer programs, when executed by the at least one processor individually or collectively, further cause the electronic device to:
- based on the similar phone sequence, determine a representative phone sequence in the similar phone sequence, according to an indication model, and
- based on the representative phone sequence, generate the first data processed result.

20. The electronic device of claim 19,
wherein the one or more computer programs, when executed by the at least one processor individually or collectively, further cause the electronic device to:
- based on the similar phone sequence, train an initial indication model, wherein, to train the initial indication model, the one or more computer programs, when executed by the at least one processor individually or collectively, further cause the electronic device to:
- determine the representative phone sequence in the similar phone sequence, according to the indication model,
- based on the similar phone sequence, acquiring acquire a first detection result, according to a first negative sample detection model,
- based on the representative phone sequence, acquire a second detection result, according to a second negative sample detection model, and
- based on the first detection result, the second detection result, and a predetermined loss function, train the indication model, and wherein the predetermined loss function includes at least one of:
- a dispersion loss function that measures a difference between the first detection result and the second detection result, or
- a mutual information loss function that measures a difference between representative phone sequences.

* * * * *